United States Patent
Saunders

(10) Patent No.: US 8,635,131 B1
(45) Date of Patent: Jan. 21, 2014

(54) SYSTEM AND METHOD FOR MANAGING A TRANSACTION PROTOCOL

(75) Inventor: Peter D Saunders, Salt Lake City, UT (US)

(73) Assignee: American Express Travel Related Services Company, Inc., New York, NY (US)

(*) Notice: Subject to any disclaimer, the term of this patent is extended or adjusted under 35 U.S.C. 154(b) by 1040 days.

(21) Appl. No.: 10/711,968

(22) Filed: Oct. 15, 2004

Related U.S. Application Data

(63) Continuation-in-part of application No. 10/192,488, filed on Jul. 9, 2002, now Pat. No. 7,239,226, and a continuation-in-part of application No. 10/340,352, filed on Jan. 10, 2003, now Pat. No. 7,889,052, which is a continuation-in-part of application No. 10/318,480, filed on Dec. 13, 2002, now Pat. No. 7,249,112.

(60) Provisional application No. 60/512,424, filed on Oct. 17, 2003, provisional application No. 60/512,297, filed on Oct. 17, 2003, provisional application No. 60/304,216, filed on Jul. 10, 2001, provisional application No. 60/396,577, filed on Jul. 16, 2002.

(51) Int. Cl.
*G06Q 40/00* (2012.01)

(52) U.S. Cl.
USPC .............................................. 705/35; 705/38

(58) Field of Classification Search
USPC .......................................................... 705/35
See application file for complete search history.

(56) References Cited

U.S. PATENT DOCUMENTS

| 4,303,904 A | 12/1981 | Chasek |
| 4,443,027 A | 4/1984 | McNeely et al. |
| 4,450,535 A | 5/1984 | de Pommery et al. |
| 4,475,308 A | 10/1984 | Heise et al. |
| 4,583,766 A | 4/1986 | Wessel |
| 4,639,765 A | 1/1987 | dHont |

(Continued)

FOREIGN PATENT DOCUMENTS

| CH | 689070 | 8/1998 |
| EP | 0 358 525 A2 | 3/1990 |

(Continued)

OTHER PUBLICATIONS

Ken B T; Method for completing payment transaction involves selecting one of payment accounts based on portion of received personal identification number and facilitating transaction by utilizing selected payment account; 2009; (14/3,K/1 (Item 1 from file: 350).*

(Continued)

*Primary Examiner* — Ella Colbert
*Assistant Examiner* — Michael Cranford
(74) *Attorney, Agent, or Firm* — Snell & Wilmer L.L.P.

(57) ABSTRACT

The invention teaches a system and method for managing a transaction account using the BIN number included in a transaction account number. The transaction account number is provided to a transaction account issuer configured to retrieve the BIN number from the transaction account. A portion of the BIN number, called the BIN identifier, is retrieved by the transaction account issuer and used to locate a corresponding use or issuer-defined transaction processing protocol stored on the account issuer system. The account issuer may then process the transaction request in accordance with the protocol located.

22 Claims, 10 Drawing Sheets

(56) References Cited

U.S. PATENT DOCUMENTS

| | | |
|---|---|---|
| 4,672,021 A | 6/1987 | Blumel et al. |
| 4,700,055 A | 10/1987 | Kashkashian, Jr. |
| 4,736,094 A | 4/1988 | Yoshida |
| 4,739,328 A | 4/1988 | Koelle et al. |
| 4,837,422 A | 6/1989 | Dethloff et al. |
| 4,839,504 A | 6/1989 | Nakano |
| 4,868,849 A | 9/1989 | Tamaoki |
| 4,961,142 A | 10/1990 | Elliott et al. |
| 5,016,274 A | 5/1991 | Micali et al. |
| 5,023,782 A | 6/1991 | Lutz et al. |
| 5,023,908 A | 6/1991 | Weiss |
| 5,025,372 A | 6/1991 | Burton et al. |
| 5,053,774 A | 10/1991 | Schuermann et al. |
| 5,099,226 A | 3/1992 | Andrews |
| 5,101,200 A | 3/1992 | Swett |
| 5,197,140 A | 3/1993 | Balmer |
| 5,202,826 A | 4/1993 | McCarthy |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik |
| 5,239,654 A | 8/1993 | IngSimmons et al. |
| 5,247,304 A | 9/1993 | dHont |
| 5,274,392 A | 12/1993 | dHont et al. |
| 5,276,311 A | 1/1994 | Hennige |
| 5,285,100 A | 2/1994 | Byatt |
| 5,305,002 A | 4/1994 | Holodak et al. |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,350,906 A | 9/1994 | Brody et al. |
| 5,351,052 A | 9/1994 | dHont et al. |
| 5,365,551 A | 11/1994 | Snodgrass et al. |
| 5,371,896 A | 12/1994 | Gove et al. |
| 5,373,303 A | 12/1994 | dHont |
| 5,397,881 A | 3/1995 | Mannik |
| 5,407,893 A | 4/1995 | Koshizuka et al. |
| 5,408,243 A | 4/1995 | dHont |
| 5,410,649 A | 4/1995 | Gove |
| 5,428,363 A | 6/1995 | dHont |
| 5,453,747 A | 9/1995 | D'Hont et al. |
| 5,461,217 A | 10/1995 | Claus |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | dHont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | dHont |
| 5,500,513 A * | 3/1996 | Langhans et al. ............ 235/380 |
| 5,500,651 A | 3/1996 | Schuermann |
| 5,504,808 A | 4/1996 | Hamrick, Jr. |
| 5,513,525 A | 5/1996 | Schuermann |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,537,314 A | 7/1996 | Kanter |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | dHont |
| 5,557,516 A | 9/1996 | Hogan |
| 5,561,430 A | 10/1996 | Knebelkamp |
| 5,563,582 A | 10/1996 | dHont |
| 5,569,187 A | 10/1996 | Kaiser |
| 5,572,226 A | 11/1996 | Tuttle |
| 5,577,109 A | 11/1996 | Stimson et al. |
| 5,577,120 A | 11/1996 | Penzias |
| 5,578,808 A | 11/1996 | Taylor |
| 5,581,630 A | 12/1996 | Bonneau, Jr. |
| 5,585,787 A | 12/1996 | Wallerstein |
| 5,590,038 A | 12/1996 | Pitroda |
| 5,592,150 A | 1/1997 | dHont |
| 5,592,405 A | 1/1997 | Gove et al. |
| 5,594,227 A | 1/1997 | Deo |
| 5,594,233 A | 1/1997 | Kenneth et al. |
| 5,594,448 A | 1/1997 | dHont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,614,703 A | 3/1997 | Martin et al. |
| 5,619,207 A | 4/1997 | dHont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | dHont |
| 5,625,370 A | 4/1997 | dHont |
| 5,625,695 A | 4/1997 | MRaihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,641,050 A | 6/1997 | Smith et al. |
| 5,646,607 A | 7/1997 | Schurmann et al. |
| 5,649,118 A | 7/1997 | Carlisle et al. |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe |
| 5,686,920 A | 11/1997 | Hurta et al. |
| 5,689,100 A | 11/1997 | Carrithers et al. |
| 5,691,731 A | 11/1997 | vanErven |
| 5,692,132 A | 11/1997 | Hogan |
| 5,696,913 A | 12/1997 | Gove et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,798 A | 1/1998 | Tarbox |
| 5,715,399 A | 2/1998 | Bezos |
| 5,721,781 A | 2/1998 | Deo et al. |
| 5,724,424 A | 3/1998 | Gifford |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | dHont et al. |
| 5,734,838 A | 3/1998 | Robinson et al. |
| 5,742,756 A | 4/1998 | Dillaway et al. |
| 5,742,845 A | 4/1998 | Wagner |
| 5,748,137 A | 5/1998 | dHont |
| 5,748,737 A | 5/1998 | Daggar |
| 5,758,195 A | 5/1998 | Balmer |
| 5,761,306 A | 6/1998 | Lewis |
| 5,761,493 A | 6/1998 | Blakeley et al. |
| 5,768,385 A | 6/1998 | Simon |
| 5,768,609 A | 6/1998 | Gove et al. |
| 5,770,843 A | 6/1998 | Rose et al. |
| 5,774,882 A | 6/1998 | Keen et al. |
| 5,777,903 A | 7/1998 | Piosenka |
| 5,778,067 A | 7/1998 | Jones et al. |
| 5,778,069 A | 7/1998 | Thomlinson |
| 5,785,680 A | 7/1998 | Niezink et al. |
| 5,792,337 A | 8/1998 | Padovani et al. |
| 5,793,324 A | 8/1998 | Aslanidis et al. |
| 5,794,095 A | 8/1998 | Thompson |

(56) References Cited

U.S. PATENT DOCUMENTS

| | | |
|---|---|---|
| 5,797,060 A | 8/1998 | Thompson |
| 5,797,085 A | 8/1998 | Beuk et al. |
| 5,797,133 A | 8/1998 | Jones et al. |
| 5,798,709 A | 8/1998 | Flaxl |
| 5,809,142 A | 9/1998 | Hurta et al. |
| 5,809,288 A | 9/1998 | Balmer |
| 5,809,633 A | 9/1998 | Mundigl et al. |
| 5,825,007 A | 10/1998 | Jesadanont |
| 5,825,302 A | 10/1998 | Stafford |
| 5,826,077 A | 10/1998 | Blakeley et al. |
| 5,826,241 A | 10/1998 | Stein |
| 5,826,242 A | 10/1998 | Montulli |
| 5,826,243 A | 10/1998 | Musmanno et al. |
| 5,828,044 A | 10/1998 | Jun et al. |
| 5,834,756 A | 11/1998 | Gutman et al. |
| 5,835,894 A | 11/1998 | Adcock et al. |
| 5,841,364 A | 11/1998 | Hagl et al. |
| 5,842,088 A | 11/1998 | Thompson |
| 5,844,218 A | 12/1998 | Kawan et al. |
| 5,844,230 A | 12/1998 | Lalonde |
| 5,845,267 A | 12/1998 | Ronen |
| 5,851,149 A | 12/1998 | Xidos et al. |
| 5,852,812 A | 12/1998 | Reeder |
| 5,854,891 A | 12/1998 | Postlewaite et al. |
| 5,858,006 A | 1/1999 | Van der AA et al. |
| 5,859,419 A | 1/1999 | Wynn |
| 5,859,779 A | 1/1999 | Giordano et al. |
| 5,862,325 A | 1/1999 | Reed et al. |
| 5,864,306 A | 1/1999 | Dwyer et al. |
| 5,864,323 A | 1/1999 | Berthon |
| 5,864,830 A | 1/1999 | Armetta et al. |
| 5,867,100 A | 2/1999 | dHont |
| 5,870,031 A | 2/1999 | Kaiser et al. |
| 5,870,915 A | 2/1999 | dHont |
| 5,878,138 A | 3/1999 | Yacobi |
| 5,878,141 A | 3/1999 | Daly et al. |
| 5,878,215 A | 3/1999 | Kling et al. |
| 5,878,337 A | 3/1999 | Joao et al. |
| 5,878,403 A | 3/1999 | DeFrancesco et al. |
| 5,880,675 A | 3/1999 | Trautner |
| 5,881,272 A | 3/1999 | Balmer |
| 5,883,810 A | 3/1999 | Franklin et al. |
| 5,884,280 A | 3/1999 | Yoshioka et al. |
| 5,887,266 A | 3/1999 | Heinonen et al. |
| 5,890,137 A | 3/1999 | Koreeda |
| 5,897,622 A | 4/1999 | Blinn et al. |
| 5,898,783 A | 4/1999 | Rohrbach |
| 5,898,838 A | 4/1999 | Wagner |
| 5,903,830 A | 5/1999 | Joao et al. |
| 5,903,875 A | 5/1999 | Kohara |
| 5,903,880 A | 5/1999 | Biffar |
| 5,905,798 A | 5/1999 | Nerlikar et al. |
| 5,905,908 A | 5/1999 | Wagner |
| 5,909,492 A | 6/1999 | Payne et al. |
| 5,912,678 A | 6/1999 | Saxena et al. |
| 5,913,203 A | 6/1999 | Wong et al. |
| 5,914,472 A | 6/1999 | Foladare et al. |
| 5,915,023 A | 6/1999 | Bernstein |
| 5,917,168 A | 6/1999 | Nakamura et al. |
| 5,918,216 A | 6/1999 | Miksovsky et al. |
| 5,920,628 A | 7/1999 | Indeck et al. |
| 5,920,847 A * | 7/1999 | Kolling et al. ............... 705/40 |
| 5,923,734 A | 7/1999 | Taskett |
| 5,929,801 A | 7/1999 | Aslanidis et al. |
| 5,930,767 A | 7/1999 | Reber et al. |
| 5,930,777 A | 7/1999 | Barber |
| 5,931,917 A | 8/1999 | Nguyen et al. |
| 5,933,624 A | 8/1999 | Balmer |
| 5,943,624 A | 8/1999 | Fox et al. |
| 5,948,116 A | 9/1999 | Aslanidis et al. |
| 5,949,044 A | 9/1999 | Walker et al. |
| 5,949,876 A | 9/1999 | Ginter et al. |
| 5,953,512 A | 9/1999 | Cai et al. |
| 5,953,710 A | 9/1999 | Fleming |
| 5,955,717 A | 9/1999 | Vanstone |
| 5,955,969 A | 9/1999 | dHont |
| 5,956,024 A | 9/1999 | Strickland et al. |
| 5,956,699 A | 9/1999 | Wong et al. |
| 5,958,004 A | 9/1999 | Helland et al. |
| 5,960,411 A | 9/1999 | Hartman et al. |
| 5,963,915 A | 10/1999 | Kirsch |
| 5,963,924 A | 10/1999 | Williams et al. |
| 5,966,697 A | 10/1999 | Fergerson et al. |
| 5,970,148 A | 10/1999 | Meier |
| 5,970,471 A | 10/1999 | Hill |
| 5,970,472 A | 10/1999 | Allsop et al. |
| 5,970,473 A | 10/1999 | Gerszberg et al. |
| 5,970,475 A | 10/1999 | Barnes et al. |
| RE36,365 E | 11/1999 | Levine et al. |
| 5,978,840 A | 11/1999 | Nguyen et al. |
| 5,979,757 A | 11/1999 | Tracy et al. |
| 5,982,293 A | 11/1999 | Everett et al. |
| 5,983,207 A | 11/1999 | Turk et al. |
| 5,983,208 A | 11/1999 | Haller |
| 5,987,140 A | 11/1999 | Rowney et al. |
| 5,987,155 A | 11/1999 | Dunn et al. |
| 5,987,498 A | 11/1999 | Athing et al. |
| 5,989,950 A | 11/1999 | Wu |
| 5,991,413 A | 11/1999 | Arditti et al. |
| 5,991,608 A | 11/1999 | Leyten |
| 5,991,748 A | 11/1999 | Taskett |
| 5,991,750 A | 11/1999 | Watson |
| 5,996,076 A | 11/1999 | Rowney et al. |
| 5,999,914 A | 12/1999 | Blinn et al. |
| 6,000,832 A | 12/1999 | Franklin et al. |
| 6,002,438 A | 12/1999 | Hocevar et al. |
| 6,002,767 A | 12/1999 | Kramer |
| 6,003,014 A | 12/1999 | Lee et al. |
| 6,005,942 A | 12/1999 | Chan et al. |
| 6,006,216 A | 12/1999 | Griffin et al. |
| 6,009,412 A | 12/1999 | Storey |
| 6,011,487 A | 1/2000 | Plocher |
| 6,012,039 A | 1/2000 | Hoffman et al. |
| 6,012,049 A | 1/2000 | Kawan |
| 6,012,143 A | 1/2000 | Tanaka |
| 6,012,636 A | 1/2000 | Smith |
| 6,014,634 A | 1/2000 | Scroggie et al. |
| 6,014,635 A | 1/2000 | Harris et al. |
| 6,014,636 A | 1/2000 | Reeder |
| 6,014,645 A | 1/2000 | Cunningham |
| 6,014,646 A | 1/2000 | Vallee et al. |
| 6,014,648 A | 1/2000 | Brennan |
| 6,014,650 A | 1/2000 | Zampese |
| 6,014,748 A | 1/2000 | Tushi et al. |
| 6,016,482 A | 1/2000 | Molinari et al. |
| 6,016,484 A | 1/2000 | Williams et al. |
| 6,018,717 A | 1/2000 | Lee et al. |
| 6,018,718 A | 1/2000 | Walker et al. |
| 6,021,943 A | 2/2000 | Chastain |
| 6,023,510 A | 2/2000 | Epstein |
| 6,024,286 A | 2/2000 | Bradley et al. |
| 6,029,147 A | 2/2000 | Horadan et al. |
| 6,029,149 A | 2/2000 | Dykstra et al. |
| 6,029,150 A | 2/2000 | Kravitz |
| 6,029,890 A | 2/2000 | Austin |
| 6,029,892 A | 2/2000 | Miyake |
| 6,032,136 A | 2/2000 | Brake et al. |
| 6,038,292 A | 3/2000 | Thomas |
| 6,038,551 A | 3/2000 | Barlow et al. |
| 6,038,584 A | 3/2000 | Balmer |
| 6,041,308 A | 3/2000 | Walker et al. |
| 6,044,360 A | 3/2000 | Picciallo |
| 6,047,888 A | 4/2000 | Dethloff |
| 6,052,675 A | 4/2000 | Checchio |
| 6,058,418 A | 5/2000 | Kobata |
| 6,061,344 A | 5/2000 | Wood, Jr. |
| 6,061,789 A | 5/2000 | Hauser et al. |
| 6,064,320 A | 5/2000 | dHont et al. |
| 6,064,981 A | 5/2000 | Barni et al. |
| 6,070,003 A | 5/2000 | Gove et al. |
| 6,070,150 A | 5/2000 | Remington et al. |
| 6,070,154 A | 5/2000 | Tavor et al. |
| 6,072,870 A | 6/2000 | Nguyen et al. |
| 6,073,840 A | 6/2000 | Marion |

(56) References Cited

U.S. PATENT DOCUMENTS

| | | |
|---|---|---|
| 6,076,078 A | 6/2000 | Camp et al. |
| 6,078,888 A | 6/2000 | Johnson, Jr. |
| 6,078,906 A | 6/2000 | Huberman |
| 6,078,908 A | 6/2000 | Schmitz |
| 6,081,790 A | 6/2000 | Rosen |
| RE36,788 E | 7/2000 | Mansvelt et al. |
| 6,088,683 A | 7/2000 | Jalili |
| 6,088,686 A | 7/2000 | Walker et al. |
| 6,088,717 A | 7/2000 | Reed et al. |
| 6,088,797 A | 7/2000 | Rosen |
| 6,092,057 A | 7/2000 | Zimmerman et al. |
| 6,092,198 A | 7/2000 | Lanzy et al. |
| 6,098,053 A * | 8/2000 | Slater ............................. 705/44 |
| 6,098,879 A | 8/2000 | Terranova |
| 6,101,174 A | 8/2000 | Langston |
| 6,102,162 A | 8/2000 | Teicher |
| 6,102,672 A | 8/2000 | Woollenweber |
| 6,105,008 A | 8/2000 | Davis et al. |
| 6,105,013 A | 8/2000 | Curry et al. |
| 6,105,865 A | 8/2000 | Hardesty |
| 6,108,641 A | 8/2000 | Kenna et al. |
| 6,109,525 A | 8/2000 | Blomqvist et al. |
| 6,112,152 A | 8/2000 | Tuttle |
| 6,112,191 A | 8/2000 | Burke |
| 6,115,360 A | 9/2000 | Quay et al. |
| 6,115,458 A | 9/2000 | Taskett |
| 6,116,423 A | 9/2000 | Troxtell, Jr. et al. |
| 6,116,505 A | 9/2000 | Withrow |
| 6,118,189 A | 9/2000 | Flaxl |
| 6,121,544 A | 9/2000 | Petsinger |
| 6,122,625 A | 9/2000 | Rosen |
| 6,123,223 A | 9/2000 | Watkins |
| 6,125,352 A | 9/2000 | Franklin et al. |
| 6,129,274 A | 10/2000 | Suzuki |
| 6,133,834 A | 10/2000 | Eberth et al. |
| 6,141,651 A | 10/2000 | Riley et al. |
| 6,141,752 A | 10/2000 | Dancs et al. |
| 6,163,771 A | 12/2000 | Walker et al. |
| 6,167,236 A | 12/2000 | Kaiser et al. |
| 6,173,269 B1 | 1/2001 | Solokl et al. |
| 6,173,272 B1 | 1/2001 | Thomas et al. |
| 6,177,860 B1 | 1/2001 | Cromer et al. |
| 6,179,205 B1 | 1/2001 | Sloan |
| 6,179,206 B1 | 1/2001 | Matsumori |
| 6,188,994 B1 | 2/2001 | Egendorf |
| 6,189,787 B1 | 2/2001 | Dorf |
| 6,192,255 B1 | 2/2001 | Lewis et al. |
| 6,198,728 B1 | 3/2001 | Hulyalkar et al. |
| 6,198,875 B1 | 3/2001 | Edenson et al. |
| 6,202,927 B1 | 3/2001 | Bashan et al. |
| 6,205,151 B1 | 3/2001 | Quay et al. |
| 6,206,293 B1 | 3/2001 | Gutman et al. |
| 6,213,390 B1 | 4/2001 | Oneda |
| 6,215,437 B1 | 4/2001 | Schurmann et al. |
| 6,216,219 B1 | 4/2001 | Cai et al. |
| 6,219,439 B1 | 4/2001 | Burger |
| 6,220,510 B1 | 4/2001 | Everett et al. |
| 6,222,914 B1 | 4/2001 | McMullin |
| D442,627 S | 5/2001 | Webb et al. |
| D442,629 S | 5/2001 | Webb et al. |
| 6,223,984 B1 | 5/2001 | Renner et al. |
| 6,226,382 B1 | 5/2001 | MRaihi et al. |
| 6,227,447 B1 | 5/2001 | Campisano |
| 6,230,270 B1 | 5/2001 | Laczko, Sr. |
| 6,232,917 B1 | 5/2001 | Baumer et al. |
| 6,233,683 B1 | 5/2001 | Chan et al. |
| 6,237,848 B1 | 5/2001 | Everett |
| 6,239,675 B1 | 5/2001 | Flaxl |
| 6,240,187 B1 | 5/2001 | Lewis |
| 6,248,199 B1 | 6/2001 | Smulson |
| 6,257,486 B1 | 7/2001 | Teicher et al. |
| 6,259,769 B1 | 7/2001 | Page |
| 6,260,026 B1 | 7/2001 | Tomida et al. |
| 6,260,088 B1 | 7/2001 | Gove et al. |
| 6,263,316 B1 | 7/2001 | Khan et al. |
| 6,264,106 B1 | 7/2001 | Bridgelall |
| 6,266,754 B1 | 7/2001 | Laczko, Sr. et al. |
| 6,267,292 B1 | 7/2001 | Walker et al. |
| 6,269,348 B1 | 7/2001 | Pare et al. |
| 6,273,335 B1 | 8/2001 | Sloan |
| 6,282,522 B1 | 8/2001 | Davis et al. |
| D447,515 S | 9/2001 | Faenza, Jr. et al. |
| 6,286,763 B1 | 9/2001 | Reynolds et al. |
| 6,289,324 B1 | 9/2001 | Kawan |
| 6,293,462 B1 | 9/2001 | Gangi |
| 6,315,193 B1 | 11/2001 | Hogan |
| 6,315,195 B1 | 11/2001 | Ramachandran |
| 6,317,721 B1 | 11/2001 | Hurta et al. |
| 6,318,636 B1 | 11/2001 | Reynolds et al. |
| 6,323,566 B1 | 11/2001 | Meier |
| 6,325,285 B1 | 12/2001 | Baratelli |
| 6,325,293 B1 | 12/2001 | Moreno |
| 6,326,934 B1 | 12/2001 | Kinzie |
| 6,327,573 B1 | 12/2001 | Walker et al. |
| 6,330,544 B1 | 12/2001 | Walker et al. |
| 6,336,095 B1 | 1/2002 | Rosen |
| 6,342,844 B1 | 1/2002 | Rozin |
| 6,353,811 B1 | 3/2002 | Weissman |
| 6,364,208 B1 | 4/2002 | Stanford et al. |
| 6,367,011 B1 | 4/2002 | Lee et al. |
| 6,374,245 B1 | 4/2002 | Park |
| 6,377,034 B1 | 4/2002 | Ivanov |
| 6,378,073 B1 | 4/2002 | Davis et al. |
| 6,388,533 B2 | 5/2002 | Swoboda |
| 6,390,375 B2 | 5/2002 | Kayanakis |
| 6,400,272 B1 | 6/2002 | Holtzman et al. |
| 6,402,026 B1 | 6/2002 | Schwier |
| 6,402,028 B1 | 6/2002 | Graham, Jr. et al. |
| 6,411,611 B1 | 6/2002 | Van der Tuijn |
| 6,415,978 B1 | 7/2002 | McAllister |
| 6,422,464 B1 | 7/2002 | Terranova |
| 6,424,029 B1 | 7/2002 | Giesler |
| RE37,822 E | 8/2002 | Anthonyson |
| 6,427,910 B1 | 8/2002 | Barnes et al. |
| 6,438,235 B2 | 8/2002 | Sims, III |
| 6,439,455 B1 | 8/2002 | Everett et al. |
| 6,442,532 B1 | 8/2002 | Kawan |
| 6,445,794 B1 | 9/2002 | Shefi |
| 6,457,996 B1 | 10/2002 | Shih |
| 6,466,804 B1 | 10/2002 | Pecen et al. |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,481,621 B1 | 11/2002 | Herrendoerfer et al. |
| 6,481,632 B2 | 11/2002 | Wentker et al. |
| 6,483,427 B1 | 11/2002 | Werb |
| 6,483,477 B1 | 11/2002 | Plonka |
| 6,483,929 B1 | 11/2002 | Murakami et al. |
| 6,484,937 B1 | 11/2002 | Devaux et al. |
| 6,490,443 B1 | 12/2002 | Freeny, Jr. |
| 6,491,229 B1 | 12/2002 | Berney |
| 6,494,380 B2 | 12/2002 | Jarosz |
| 6,507,762 B1 | 1/2003 | Amro et al. |
| 6,510,983 B2 | 1/2003 | Horowitz et al. |
| 6,510,998 B1 | 1/2003 | Stanford et al. |
| 6,513,015 B2 | 1/2003 | Ogasawara |
| 6,519,565 B1 | 2/2003 | Clements et al. |
| 6,520,542 B2 | 2/2003 | Thompson et al. |
| 6,529,880 B1 | 3/2003 | McKeen et al. |
| 6,535,726 B1 | 3/2003 | Johnson |
| 6,546,373 B1 | 4/2003 | Cerra |
| 6,547,133 B1 | 4/2003 | DeVries, Jr. et al. |
| 6,549,912 B1 | 4/2003 | Chen |
| 6,560,581 B1 | 5/2003 | Fox et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,587,835 B1 | 7/2003 | Treyz et al. |
| 6,588,660 B1 | 7/2003 | Buescher et al. |
| 6,589,119 B1 | 7/2003 | Orus et al. |
| 6,598,024 B1 | 7/2003 | Walker et al. |
| 6,608,995 B1 | 8/2003 | Kawasaki et al. |
| 6,609,655 B1 | 8/2003 | Harrell |
| 6,623,039 B2 | 9/2003 | Thompson et al. |

(56) References Cited

U.S. PATENT DOCUMENTS

| | | | |
|---|---|---|---|
| 6,626,356 | B2 | 9/2003 | Davenport et al. |
| 6,628,961 | B1 | 9/2003 | Ho et al. |
| 6,636,833 | B1 | 10/2003 | Flitcroft et al. |
| 6,650,887 | B2 | 11/2003 | McGregor et al. |
| 6,662,166 | B2 | 12/2003 | Pare et al. |
| 6,665,405 | B1 | 12/2003 | Lenstra |
| 6,669,086 | B2 | 12/2003 | Abdi et al. |
| 6,671,358 | B1 | 12/2003 | Seidman et al. |
| 6,674,786 | B1 | 1/2004 | Nakamura et al. |
| 6,679,427 | B1 | 1/2004 | Kuroiwa |
| 6,681,328 | B1 | 1/2004 | Harris et al. |
| 6,684,269 | B2 | 1/2004 | Wagner |
| 6,687,714 | B1 | 2/2004 | Kogen et al. |
| 6,690,930 | B1 | 2/2004 | Dupre |
| 6,693,513 | B2 | 2/2004 | Tuttle |
| 6,705,530 | B2 | 3/2004 | Kiekhaefer |
| 6,711,262 | B1 | 3/2004 | Watanen |
| 6,732,936 | B1 | 5/2004 | Kiekhaefer |
| 6,742,120 | B1 | 5/2004 | Markakis et al. |
| 6,747,546 | B1 | 6/2004 | Hikita et al. |
| 6,760,581 | B2 | 7/2004 | Dutta |
| 6,769,718 | B1 | 8/2004 | Warther et al. |
| 6,771,981 | B1 | 8/2004 | Zalewski et al. |
| 6,789,012 | B1 | 9/2004 | Childs et al. |
| 6,834,270 | B1 | 12/2004 | Pagani et al. |
| 6,851,617 | B2 | 2/2005 | Saint et al. |
| 6,853,087 | B2 | 2/2005 | Neuhaus et al. |
| 6,853,894 | B1 | 2/2005 | Kolls |
| 6,853,987 | B1 | 2/2005 | Cook |
| 6,857,566 | B2 | 2/2005 | Wankmueller |
| 6,859,672 | B2 | 2/2005 | Roberts et al. |
| 6,895,310 | B1 | 5/2005 | Kolls |
| 6,994,262 | B1 | 2/2006 | Warther |
| 7,003,501 | B2 | 2/2006 | Ostroff |
| 7,069,444 | B2 | 6/2006 | Lowensohn et al. |
| 7,096,204 | B1 | 8/2006 | Chen et al. |
| 7,100,821 | B2 | 9/2006 | Rasti |
| 7,103,575 | B1 | 9/2006 | Linehan |
| 7,136,835 | B1 | 11/2006 | Flitcroft et al. |
| 7,213,748 | B2 | 5/2007 | Tsuei et al. |
| 7,249,112 | B2 * | 7/2007 | Berardi et al. .................. 705/79 |
| 7,383,223 | B1 * | 6/2008 | Dilip et al. ....................... 705/39 |
| 2001/0013542 | A1 | 8/2001 | Horowitz et al. |
| 2001/0024157 | A1 | 9/2001 | Hansmann et al. |
| 2001/0034565 | A1 | 10/2001 | Leatherman |
| 2001/0034720 | A1 | 10/2001 | Armes |
| 2001/0039617 | A1 | 11/2001 | Buhrlen et al. |
| 2001/0049628 | A1 | 12/2001 | Icho |
| 2002/0011519 | A1 | 1/2002 | Shults |
| 2002/0026419 | A1 | 2/2002 | Maritzen et al. |
| 2002/0028704 | A1 | 3/2002 | Bloomfield et al. |
| 2002/0035548 | A1 | 3/2002 | Hogan et al. |
| 2002/0046341 | A1 | 4/2002 | Kazaks et al. |
| 2002/0052839 | A1 | 5/2002 | Takatori |
| 2002/0062284 | A1 | 5/2002 | Kawan |
| 2002/0074398 | A1 | 6/2002 | Lancos et al. |
| 2002/0077837 | A1 | 6/2002 | Krueger et al. |
| 2002/0077895 | A1 | 6/2002 | Howell |
| 2002/0077992 | A1 | 6/2002 | Tobin |
| 2002/0079367 | A1 | 6/2002 | Montani |
| 2002/0092914 | A1 | 7/2002 | Pentz et al. |
| 2002/0095298 | A1 | 7/2002 | Ewing |
| 2002/0095343 | A1 | 7/2002 | Barton et al. |
| 2002/0095389 | A1 | 7/2002 | Gaines |
| 2002/0095587 | A1 | 7/2002 | Doyle et al. |
| 2002/0097144 | A1 | 7/2002 | Collins et al. |
| 2002/0107007 | A1 | 8/2002 | Gerson |
| 2002/0107742 | A1 | 8/2002 | Magill |
| 2002/0109580 | A1 | 8/2002 | Shreve et al. |
| 2002/0111210 | A1 | 8/2002 | Luciano, Jr. et al. |
| 2002/0111917 | A1 | 8/2002 | Hoffman et al. |
| 2002/0113082 | A1 | 8/2002 | Leatherman et al. |
| 2002/0116274 | A1 | 8/2002 | Hind et al. |
| 2002/0120584 | A1 | 8/2002 | Hogan et al. |
| 2002/0126010 | A1 | 9/2002 | Trimble et al. |
| 2002/0131567 | A1 | 9/2002 | Maginas |
| 2002/0138438 | A1 | 9/2002 | Bardwell |
| 2002/0140542 | A1 | 10/2002 | Prokoski et al. |
| 2002/0145043 | A1 | 10/2002 | Challa et al. |
| 2002/0147913 | A1 | 10/2002 | Lun Yip |
| 2002/0148892 | A1 | 10/2002 | Bardwell |
| 2002/0152123 | A1 | 10/2002 | Giordano et al. |
| 2002/0154795 | A1 | 10/2002 | Lee et al. |
| 2002/0166891 | A1 | 11/2002 | Stoutenburg et al. |
| 2002/0174067 | A1 | 11/2002 | Hoffman et al. |
| 2002/0176522 | A1 | 11/2002 | Fan |
| 2002/0178063 | A1 | 11/2002 | Gravelle et al. |
| 2002/0178369 | A1 | 11/2002 | Black |
| 2002/0185543 | A1 | 12/2002 | Pentz et al. |
| 2002/0188501 | A1 | 12/2002 | Lefkowith |
| 2002/0190125 | A1 | 12/2002 | Stockhammer |
| 2002/0194303 | A1 | 12/2002 | Suila et al. |
| 2002/0194503 | A1 | 12/2002 | Faith et al. |
| 2002/0196963 | A1 | 12/2002 | Bardwell |
| 2003/0009382 | A1 | 1/2003 | DArbeloff et al. |
| 2003/0014307 | A1 | 1/2003 | Heng |
| 2003/0014357 | A1 | 1/2003 | Chrisekos et al. |
| 2003/0014891 | A1 | 1/2003 | Nelms et al. |
| 2003/0018532 | A1 | 1/2003 | Dudek et al. |
| 2003/0018567 | A1 | 1/2003 | Flitcroft et al. |
| 2003/0025600 | A1 | 2/2003 | Blanchard |
| 2003/0028481 | A1 | 2/2003 | Flitcroft et al. |
| 2003/0046228 | A1 | 3/2003 | Berney |
| 2003/0054836 | A1 | 3/2003 | Michot |
| 2003/0055727 | A1 | 3/2003 | Walker et al. |
| 2003/0057226 | A1 | 3/2003 | Long |
| 2003/0057278 | A1 | 3/2003 | Wong |
| 2003/0069828 | A1 | 4/2003 | Blazey et al. |
| 2003/0069846 | A1 | 4/2003 | Marcon |
| 2003/0112972 | A1 | 6/2003 | Hattick et al. |
| 2003/0120554 | A1 | 6/2003 | Hogan et al. |
| 2003/0121969 | A1 | 7/2003 | Wankmueller |
| 2003/0130820 | A1 | 7/2003 | Lane, III |
| 2003/0132284 | A1 | 7/2003 | Reynolds et al. |
| 2003/0140228 | A1 | 7/2003 | Binder |
| 2003/0163699 | A1 | 8/2003 | Pailles et al. |
| 2003/0167207 | A1 | 9/2003 | Berardi et al. |
| 2003/0177347 | A1 | 9/2003 | Schneier et al. |
| 2003/0183689 | A1 | 10/2003 | Swift et al. |
| 2003/0183699 | A1 | 10/2003 | Masui |
| 2003/0187786 | A1 | 10/2003 | Swift et al. |
| 2003/0187787 | A1 | 10/2003 | Freund |
| 2003/0187790 | A1 | 10/2003 | Swift et al. |
| 2003/0187796 | A1 | 10/2003 | Swift et al. |
| 2003/0195037 | A1 | 10/2003 | Vuong et al. |
| 2003/0195842 | A1 | 10/2003 | Reece |
| 2003/0195843 | A1 | 10/2003 | Matsuda et al. |
| 2003/0200184 | A1 | 10/2003 | Dominguez et al. |
| 2003/0218066 | A1 | 11/2003 | Fernandes et al. |
| 2003/0220876 | A1 | 11/2003 | Burger et al. |
| 2003/0222153 | A1 | 12/2003 | Pentz et al. |
| 2003/0225623 | A1 | 12/2003 | Wankmueller |
| 2003/0225713 | A1 | 12/2003 | Atkinson et al. |
| 2003/0227550 | A1 | 12/2003 | Manico et al. |
| 2003/0233334 | A1 | 12/2003 | Smith |
| 2004/0006539 | A1 | 1/2004 | Royer et al. |
| 2004/0010462 | A1 | 1/2004 | Moon et al. |
| 2004/0015451 | A1 | 1/2004 | Sahota et al. |
| 2004/0016796 | A1 | 1/2004 | Hann et al. |
| 2004/0020982 | A1 | 2/2004 | Hoffman et al. |
| 2004/0029569 | A1 | 2/2004 | Khan et al. |
| 2004/0030601 | A1 | 2/2004 | Pond et al. |
| 2004/0039814 | A1 | 2/2004 | Crabtree et al. |
| 2004/0039860 | A1 | 2/2004 | Mills et al. |
| 2004/0044627 | A1 | 3/2004 | Russell et al. |
| 2004/0083184 | A1 | 4/2004 | Tsuei et al. |
| 2004/0139021 | A1 | 7/2004 | Reed et al. |
| 2005/0017068 | A1 | 1/2005 | Zalewski et al. |
| 2005/0038718 | A1 | 2/2005 | Barnes et al. |
| 2005/0040272 | A1 | 2/2005 | Argumedo et al. |
| 2005/0119978 | A1 | 6/2005 | Ates |
| 2005/0121512 | A1 | 6/2005 | Wankmueller |
| 2006/0020542 | A1 * | 1/2006 | Litle et al. ........................ 705/40 |
| 2009/0037333 | A1 * | 2/2009 | Flitcroft et al. .................. 705/39 |

(56) References Cited

U.S. PATENT DOCUMENTS

FOREIGN PATENT DOCUMENTS

| | | |
|---|---|---|
| EP | 0 424 726 A1 | 10/1990 |
| EP | 0 484 726 A1 | 5/1992 |
| EP | 0 933 717 A2 | 8/1999 |
| EP | 99/49424 A | 9/1999 |
| EP | 0 956 818 A1 | 11/1999 |
| EP | 0 959 440 A2 | 11/1999 |
| EP | 0 984 404 A2 | 3/2000 |
| EP | 1 016 947 A2 | 7/2000 |
| EP | 1 039 403 A2 | 9/2000 |
| EP | 1 104 909 A2 | 6/2001 |
| EP | 1 113 387 A2 | 7/2001 |
| EP | 1 115 095 A2 | 7/2001 |
| EP | 1 199 684 A2 | 4/2002 |
| EP | 1 251 450 A1 | 10/2002 |
| GB | 2 347 537 A | 9/2000 |
| GB | 2 361 790 A | 10/2001 |
| JP | 2000-1109 A | 1/2000 |
| JP | 2000-015288 A | 1/2000 |
| JP | 2000011109 A | 1/2000 |
| JP | 2000-40181 A | 2/2000 |
| JP | 2000-67312 A | 3/2000 |
| JP | 2000-207641 A | 7/2000 |
| JP | 2000207641 A | 7/2000 |
| JP | 2001-5931 A | 1/2001 |
| JP | 2001-283122 A | 10/2001 |
| WO | WO 95/32919 A1 | 12/1995 |
| WO | 97/09688 A3 | 3/1997 |
| WO | WO 99/03057 A1 | 1/1999 |
| WO | WO 00/10144 A1 | 2/2000 |
| WO | WO 00/38088 A1 | 6/2000 |
| WO | 00/49586 A | 8/2000 |
| WO | WO 01/04825 A1 | 1/2001 |
| WO | WO 01/15098 A1 | 3/2001 |
| WO | WO 01/43095 A2 | 6/2001 |
| WO | WO 01/72224 A1 | 10/2001 |
| WO | WO 01/77856 A1 | 10/2001 |
| WO | WO 01/80473 A2 | 10/2001 |
| WO | WO 01/86535 A1 | 11/2001 |
| WO | WO 01/90962 A1 | 11/2001 |
| WO | WO 01/95243 A2 | 12/2001 |
| WO | WO 02/01485 A1 | 1/2002 |
| WO | WO 02/13134 A2 | 2/2002 |
| WO | WO 02/21903 A1 | 3/2002 |
| WO | WO 02/063545 A2 | 8/2002 |
| WO | WO 02/065246 A2 | 8/2002 |
| WO | WO 02/065404 A2 | 8/2002 |
| WO | WO 02/069221 A1 | 9/2002 |
| WO | WO 02/073512 A1 | 9/2002 |
| WO | WO 02/086665 A2 | 10/2002 |
| WO | WO 02/091281 A2 | 11/2002 |
| WO | WO 02/097575 A2 | 12/2002 |
| WO | WO 02/101670 A2 | 12/2002 |
| WO | 03/007623 A3 | 1/2003 |

OTHER PUBLICATIONS

Ueda Hiroyuki; Transaction processing apparatus; 2010; 14/3,/K/2 (Item 2 from file: 350).*
Sakabayashit T; User identification method for personal identification of user of internet banking service permits transaction when both converted personal identification number (PIN) code using group configuration data and selection data correspond; 2005; 14/3,K/3 (Item 3 from file: 350).*
"What's New: Timex Watch Features Speedpass System" http://www.speedpass.com/news/article.jsp?id=51 (1 page).
"Physical Reality: A Second Look", Ken Sharp, Senior Technical Editor, http://www.idsystems.com/reader/1999_03/phys0399_pt2/phys0399_pt2.htm (6 pages).
"'Magic Wands' to Speed Mobile Sales", BobBrewin, Jan. 15, 2001, http://www.computerworld.com/mobiletopics/mobile/story/1,10801,563300.html (4 pages).
"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/re112.htm (3 pages).
"Speedpass Unleashed", Jun. 4, 2002 http://www.cardweb.com/cardtrak/news/cf2_20a_97.html (2 pages).
Prophecy Central Update #9, Oct. 10, 1997, http://www.bible-prophecy.com/pcu9.htm (5 pages).
International Newsletter of the TI RFID Group, Issue 20, 2000 (12 pages).
"CES: Microsoft's SPOT Technology has Humble Origins", by James Niccolai, Jan. 10, 2003, http://archive.inforworld.com/articles/hn/xml/03/01/10/030110hnspot.xml?s=IDGNS (3 pages).
"Microsoft: See SPOT Run on Your Wrist", by Richard Shim, Jun. 5, 2003, http://news.com.com/2100-1041_3-1013442.html?tag=fd_top (1 page).
"Networking: Microsoft SPOT", by Jeremy A. Kaplan, Jul. 1, 2003, http://www.pcmag.com/print_aricle/0,3048,a=43561,00.asp (2 pages).
"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).
"Bank Extends RFID Payment Pilot: Bank of America will continue to test its QuickWave RFID payment card for another three months", RFID Journal, Jan. 23, 2003.
"MasterCard to Test RFID Card: Pilot will test whether consumers, merchants and credit card issuers value "contactless" payments", RFID Journal, Dec. 20, 2002.
"Vendors Target Amusement Parks: Protecting children and enabling cashless payments make RFID an appealing option for the entertainment industry", RFID Journal, Nov. 27, 2002.
"Inside's Next-Gen Smart Card: The French company plans to introduce an RFID card that uses a 16-bit microprocessor and new encryption technology", RFID Journal, Oct. 29, 2002.
"Sony, Philips Creating RFID Link: Consumer electronics giants are jointly developing a new RFID standard for payments and for communication between devices", RFID Journal, Sep. 17, 2002.
"Japan Gets Digital Ticket System: A national ticket seller and phone company are teaming up to create an electronic ticket", RFID Journal, Aug. 31, 2002.
"Security for Wireless Java: NTRU: A startup that offers security software, has relased of Java version of its NTRU encryption algorithm", RFID Journal, Jun. 27, 2002.
"Making RFID Payments Ubiquitous: Philips and Visa want people to be able to pay for goods and services anywhere by using RFID chips embedded in the phones and other devices", RFID Journal, Jun. 2, 2003.
"RFID Smart Cards Gain Ground: The convenience of contactless transactions is driving widespread adoption of contactless smart cards", RFID Journal, Apr. 9, 2003.
"TI Embarces Prox Card Standard: Texas Instruments ISO 14443 payment platform promises faster data transfer rates and more security", RFID Journal, Mar. 6, 2003.
"Multiple Frequency Transponders: Volume production of dual-band RFID chips begins", Frontline Solutions, Jul. 16, 2003.
Functional Specification, Standard Card IC MFI IC S50, Philips Semiconductors, Product Specification Rev. 5.1 May 2001.
"Credit Card Offer Travelers New Benefit", PR Newswire, Aug. 5, 1987.
"Fingerprint Analysis—The Basics", http://www.crimtrac.gov.au/fingerprintanalysis.htm, Feb. 18, 2004, 3 pages.
"Fingerprint Technology—Identix Inc.—Empowering Identification™—Understanding Biometrics", http://www.identix.com/newsroom/news_biometrics_finger.html, Feb. 18, 2004, 1 page.
"Identix Inc.—Empowering Identification™—Understanding Biometrics", http://www.identix.com/newsroom/news-biometrics_face.html, 1 page.
"Individual Biometric—Facial Recognition", http://ctl.ncsc.dni.us/biomet%20web/Bmfacial.html, Feb. 18, 2004, 2 pages.
"Individual Biometric—Fingerprint", http://ctl.ncsc.dni.us/biomet%20web/BMFingerprint.html, Feb. 18, 2004, 3 pages.

(56) References Cited

OTHER PUBLICATIONS

"Individual Biometric—Hand Geometry", http://ctl.ncsc.dni.us/biomet%20web/BMHand.html, Feb. 18, 2004, 2 pages.
"Individual Biometric—Iris Scan", http://ctl.ncsc.dni.us/biomet%20web/BMIris.html, Feb. 18, 2004, 2 pages.
"Individual Biometric—Retinal Scan", http://ctl.ncsc.dni.us/biomet%e20web/BMRetinal.html, Feb. 18, 2004, 2 pages.
"Individual Biometric—Vascular Patterns", http://ctl.ncsc.dni.us/biomet%20web/BMVascular.html, Feb. 18, 2004, 1 page.
"International Biometric Group—Signature Biometrics: How it Works", http://www.ibgweb.com/reports/public/reports/signature-scan_tech.html, Feb. 18, 2004, 1 page.
"International Biometric Group—Voice Recognition Technology: How It Works", http://www.ibgweb.com/reports/public/reports/voice-scan_tech.html, Feb. 18, 2004, 1 page.
"ISO Magnetic Strip Card Standards", http://www.cyberd.co.uk/support/technotes/isocards.htm, Feb. 9, 2004, 4 pages.
"New Evidence about Positive Three-Tier Co-pay Performance Presented at Express Scripts 2000 Outcomes Conference", PR Newswire Association, Inc., Jun. 28, 2000.
"Pay by Touch—Press Releases", http://www.paybytouch.com/press/html, Feb. 10, 2004, 3 pages.
"Paying It by Ear", The Guardian http://money.guardian.co.uk/creditanddebt/creditcards/story/0,1456,876908,00.html, Jan. 18, 2003, 3 pages.
"PowerPay RFID Payment and Marketing Solution Speeds Purchases at Seahawks Stadium with Technology from Texas Instruments", http://www.powerpayit.com/news/Seahawks_pr.html, Feb. 9, 2004, 20 pages.
"Prestige Credit Cards: Those Pricey Plastics", Changing Times, Apr. 1986.
"Shell Introduces Optional Credit Card", The Associated Press, Sep. 3, 1985.
"Shell Introducing Expanded 'Signature' Credit Card", Tulsa Business Chronicle, Sep. 5, 1985.
"Shell-Oil: Introduces Shell Signature Travel and Entertainment Credit Card", Business Wire, Sep. 3, 1985.
"Smart Card Developer's Kit: Some Basic Standards for Smart Card", http://unix.be.eu.org/docs/smart-card-developer-kit/ch03/033-035.html, Feb. 9, 2004, 2 pages.
"The Chase Manhattan Bank Today Announced a Comprehensive Program to Enhance the Value of All its Credit Cards", PR newswire, Dec. 18, 1986.
"The Henry Classification System", International Biometric Group, 7 pages.
American Express to offer disposable credit card numbers, CNN.com. U.S. News, www.cnn.com/2000/US/09/08/online.payments.ap/, Sep. 8, 2000.
American Express, Private Payments SM: A New Level of Security from American Express, American Express Website, Cards.
Bonsor, "How Facial Recognition Systems Work", http://computer.howstuffworks.com/facial-recognition.htm/printable, Feb. 18, 2004, 6 pages.
Bowman, "Everything You Need to Know About Biometrics", Identix Corporation, Jan. 2008, 8 pages.
Carey, Gordon, "Multi-tier Copay", Pharmaceutical Executive, Feb. 2000.
Crumbaugh, Darlene M., "Effective Marketing Positions: Check card as consumer lifeline", Hoosier Banker, Apr. 1998, p. 10, vol. 82, Issue 4.
Disposable Credit Card Numbers, courtesy of CardRatings.org, The Dollar Stretcher, www.stretcher.com/stories/01/010212e.cfm, Jan. 2001.
Docmemory, RFID Takes Priority With Wal-Mart, http://www.simmtester.com/page/news/shownews.asp?num=6650, Feb. 9, 2004, 2 pages.age
Evers, "Judge Dismisses FTC Suite Against Rambus", IDG New Service, http://www.infoworld.com/article/04/02/18/HNjudgedismisses_1.html, Feb. 18, 2004, 3 pages.

Gabber, et al., "Agora: A Minimal Distributed Protocol for Electronic Commerce", USENIX Oakland, CA, Nov. 18, 1996.
Goldwasser, Joan, "Best of the Cash-back Cards", Kiplinger's Personal Finance Magazine, Apr. 1999.
Greene, Thomas C., American Express offers temporary CC Numbers for the Web, The Register, www.theregister.com.uk/content/1/13132.html, Sep. 9, 2000.
Harris, "How Fingerprint Scanners Work", http://computer.howstuffworks.com/fingerprint-scanner.htm/printable, Feb. 18, 2004, 6 pages.
http://www.palowireless.com/infotooth/tutorial.asp, Apr. 28, 2003.
http://www.palowireless.com/infotooth/tutorial/l2cap.asp, Apr. 28, 2003.
http://www.palowireless.com/infotooth/tutorial/baseband.asp, Apr. 28, 2003.
http://www.palowireless.com/infotooth/tutorial/hci.asp, Apr. 28, 2003.
http://www.palowireless.com/infotooth/tutorial/Imp.asp, Apr. 28, 2003.
http://www.palowireless.com/infotooth/tutorial/k1_gap.asp, Apr. 28, 2003.
http://www.palowireless.com/infotooth/tutorial/profiles.asp, Apr. 28, 2003.
http://www.palowireless.com/infotooth/tutorial/radio.asp, Apr. 28, 2003.
http://www.palowireless.com/infotooth/tutorial/rfcomm.asp, Apr. 28, 2003.
http://www.palowireless.com/infotooth/tutorial/sdp.asp, Apr. 28, 2003.
http://www.palowireless.com/infotooth/whatis.asp, Apr. 28, 2003.
http://www.semiconductors.philips.com/news/content/file_878.html, Apr. 7, 2003.
Hurley et al., "Automatic Ear Recognition by Force Field Transformations", The Institution of Electrical Engineers, 2000, pp. 7/1-7/5.
International Search Report and Written Opinion of the International Searching Authority, PCT/US05/26067, May 23, 2007.
International Search Report and Written Opinion of the International Searching Authority, PCT/US05/26101, May 13, 2008.
Korotkaya, "Biometric Person Authentication: Odor", Department of Information Technology, Laboratory of Applied Mathematics, Lappeenranta University of Technology, 18 pages.
Krakow, "Credit on Your Key Ring, Buy Gas at Mobil, Exxon and Soon Burgers at McDonald's", MSNBC, http://www.msnbc.msn.com/id/3072638, Feb. 17, 2004, 4 pages.
Kulkarni, et al., "Biometrics: Speaker Verification" http://biometrics.cse.msu.edu/speaker.html, Mar. 8, 2004, 5 pages.
Kuntz, Mary, "Credit Cards as Good as Gold", Forbes, Nov. 4, 1985.
Lahey, Liam, "Microsoft Bolsters Rebate Structure", Computer Dealer News, Feb. 8, 2002.
Lamond, "Credit Card Transactions Real World and Online" © 1996.
Luettin, "Visual Speech and Speaker Recognition", http://herens.idiap.ch/~luettin/luettin-thesis.bib.abs.html, Jun. 30, 2000, 1 page.
Martin, Zack, One-Time Numbers Stop Web Hackers From Pilfering Data, Card Marketing, Thomson Financial, www.cardforum.com/html/cardmark/jan01_c3.htm, Jan. 2001.
McPerson, "The Evolution of Mobile Payment", Financial Insights, http://www.banktech.com/story/news/showArticle.jhtml?articleID=17601432, Feb. 2, 2004, 2 pages.
Nyman, Judy, "Free Income Tax Clinics are Opening as Apr. 30 Deadline Draws Nearer", The Toronto Star, Final Edition, Mar. 25, 1986.
Obel, Michael, "Oil Companies Push Marketing, Cost Cutting to Fortify Earnings", Oil & Gas Journal, Sep. 16, 1985.
Pay by Touch—Company, http://www.paybytouch.com/company.html.
Roberti, "TI Embraces Prox Card Standard", http://www.ti.com/tiris/docs/news/in_the_news/2003/3-6-03.shtml, Mar. 6, 2003, 2 pages.
Rohde, "Microsoft, IBM and Phillips Test RFID Technology", IDG New Service, http://www.computerweekly.com/Article127889.htm, Feb. 9, 2004, 3 pages.
Ross et al., "Biometrics: Hand Geometry", http://biometrics.cse.msu.msu.edu/hand_geometry.html, Feb. 26, 2004, 2 pages.

(56) References Cited

OTHER PUBLICATIONS

Schmuckler, Eric, "Playing Your Cards Right", Forbes, Dec. 28, 1987.

Sony, Philips to Test RFID Platform, RFID Journal, May 8, 2003, 2 pages.

Wilson, "Putting Their Finger on It", http://sanfrancisco.bizjournals.com/sanfrancisco/stories/2003/10/20/story6.html?t=printable, Feb. 9, 2004, 2 pages.

"Core One Credit Union—Discover the Advantage", http://coreone.org/2visa.html, Copyright 2001, (Last Visited Oct. 9, 2002).

* cited by examiner

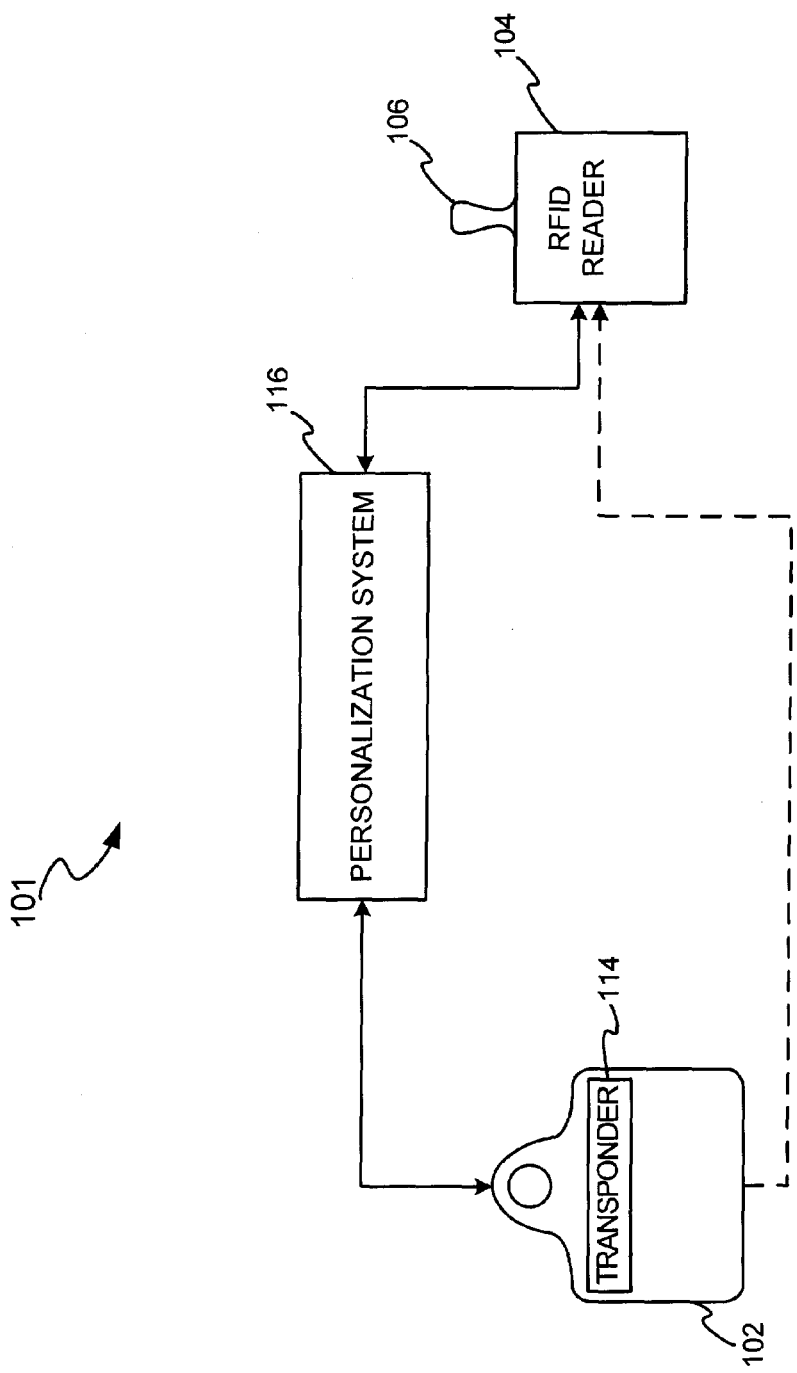

SYSTEM AND METHOD FOR MANAGING A TRANSACTION PROTOCOL

CROSS-REFERENCE TO RELATED APPLICATIONS

This invention claims priority to and the benefit of U.S. Provisional Application No. 60/512,424, filed Oct. 17, 2003. This invention also claims priority to and the benefit of U.S. Provisional Application No. 60/512,297, filed Oct. 17, 2003. This invention is also a continuation-in-part of and claims priority to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed Jul. 9, 2002. This invention is also a continuation-in-part of and claims priority to U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003, which itself is a continuation-in-part of and claims priority to U.S. patent application Ser. No. 10/318,480, entitled "SYSTEM AND METHOD FOR ASSIGNING A FUNDING SOURCE FOR A RADIO FREQUENCY IDENTIFICATION DEVICE," filed Dec. 13, 2000. The '480 application claims priority to and the benefit of U.S. Provisional Application No. 60/396,577, filed Jul. 10, 2001. All of the above-mentioned applications are incorporated herein by reference.

FIELD OF INVENTION

This invention generally relates to a system and method for completing a transaction, and more particularly, managing a transaction request which may be associated with a Radio Frequency transaction device.

BACKGROUND OF INVENTION

Like barcode and voice data entry, RF is a contactless information acquisition technology. RF systems are wireless, and are usually extremely effective in hostile environments where conventional acquisition methods fail. RF has established itself in a wide range of markets, such as, for example, the high-speed reading of railway containers, tracking moving objects such as livestock or automobiles, and retail inventory applications. As such, RF technology has become a primary focus in automated data collection, identification and analysis systems worldwide.

Of late, companies are increasingly embodying RF data acquisition technology in a fob or tag for use in completing financial transactions. A typical fob includes a transponder and is ordinarily a self-contained device which may be contained on any portable form factor. In some instances, a battery may be included with the fob to power the transponder. In which case the internal circuitry of the fob (including the transponder) may draw its operating power from the battery power source. Alternatively, the fob may exist independently of an internal power source. In this instance the internal circuitry of the fob (including the transponder) may gain its operating power directly from an RF interrogation signal. U.S. Pat. No. 5,053,774, issued to Schuermann, describes a typical transponder RF interrogation system which may be found in the prior art. The Schuermann patent describes in general the powering technology surrounding conventional transponder structures. U.S. Pat. No. 4,739,328 discusses a method by which a conventional transponder may respond to a RF interrogation signal. Other typical modulation techniques which may be used include, for example, ISO/IEC 14443 and the like.

In the conventional fob powering technologies used, the fob is typically activated upon presenting the fob in an interrogation signal. In this regard, the fob may be activated irrespective of whether the user desires such activation. Inadvertent presentation of the fob may result in initiation and completion of an unwanted transaction. Thus, a fob system is needed which allows the fob user to control activation of the fob to limit transactions being undesirably completed.

One of the more visible uses of the RF technology is the radio frequency identification technology (RFID) found in the introduction of Exxon/Mobil's Speedpass® and Shell's EasyPay® products. These products use transponders placed in a fob or tag which enables automatic identification of the user when the fob is presented at a Point-of-Sale (POS) device. Fob identification data is typically passed to a third-party server database, where the identification data is referenced to a customer (e.g., user) credit or debit account. In an exemplary processing method, the server seeks authorization for the transaction by passing the transaction and account data to an authorizing entity. Once authorization is received by the server, clearance is sent to the point-of-sale device for transaction processing.

Traditional transponder-reader systems, however, are limited in that they do not permit the user to manage the system user account data. This is extremely problematic where the user wishes to change a transponder-reader system funding source to a source which provides more available spending room, or where the user wishes the pre-identity of a particular funding source for a particular transaction.

Thus a need exists for a transponder-reader system which will allow the user limited access to the transponder-reader account for managing account data.

SUMMARY OF INVENTION

Described herein is a system and method for managing a transaction protocol using a unique BIN number. The unique BIN identifier may be, for example, a portion of a BIN number associated with a particular funding source. The unique BIN identifier may be an identifier ordinarily included in the BIN number, that may be used to establish a transaction processing protocol. In one exemplary embodiment, the unique BIN identifier may be used to indicate a product family, type of transaction, or the like, and to establish transaction protocol associated thereto.

In another exemplary embodiment, the unique BIN identifier may be provided to a RF operable transaction device. The RF transaction device may then be presented for transaction completion, wherein the transaction device provides the BIN identifier for transaction completion. A transaction request, including the BIN number, is provided to a RF transaction device account provider for transaction processing. The RF transaction device account provider may receive the BIN number and retrieve the BIN identifier therefrom. The RF transaction account provider may then process the transaction request under a pre-established transaction processing protocol associated with the BIN identifier.

The RF transaction device may be configured to transmit the BIN number within the confines of a RF transaction device-reader transaction system. The RF transaction device-reader transaction system described herein may include a RFID reader operable to provide a RF interrogation signal for powering a transponder system included in the RF transaction device, receiving RF transaction device user account data, and providing the account data to a merchant system for transaction processing. The system may include a RFID reader protocol/sequence controller in electrical communication with one or more transponders for providing an interrogation signal to a RF transaction device transponder. The RFID reader may include a authentication circuit for authenticating the signal received from the RF transaction device transponder, and a serial or parallel interface for interfacing with a point-of-interaction device.

The RF transaction device according to the present invention may include a RF operable transponder which may be embodied in a fob, tag, card or any other form factor (e.g., wristwatch, keychain, cell phone, etc.), which may be capable of being presented for interrogation. In that regard, although the transponder is described herein as embodied in a fob, the invention is not so limited.

During operation, the fob may be placed within proximity to the RFID reader such that the RFID signal may interrogate the fob and initialize fob identification procedures.

In one exemplary embodiment, as a part of the identification process, the fob and the RFID reader may engage in mutual authentication. The RFID reader may identify the fob as including an authorized system transponder for receiving encrypted information and storing the information on the fob memory. Similarly, the fob, upon interrogation by the RFID reader, may identify the RFID reader as authorized to receive the encrypted and stored information. Where the RFID reader and the fob successfully mutually authenticate, the fob may transmit to the RFID reader user account data for identifying the transaction account or accounts to which the fob is associated. The mutual authorization process disclosed herein aids in ensuring fob RF transaction device reader transaction system security.

In another exemplary embodiment, the fob according to the present invention, includes means for completing transactions via a computer interface. The fob may be connected to the computer using a USB or serial interface fob account information may be transferred to the computer for use in completing a transaction via a network (e.g., the Internet).

In still another exemplary embodiment of the invention, a system is disclosed which permits the user to manage the account associated with the fob. The user is provided limited access to the fob account information stored on the RF transaction device account provider database for updating, for example, account funding source, and/or account restrictions (e.g., spending limits, personal identification number, etc.).

In yet another exemplary embodiment of the invention, a system is provided whereby the user is permitted to select one or more funding sources for use in satisfying a merchant request. The user may designate a funding source using the aforementioned BIN identifier. The user may switch funding sources manually by, for example, contacting the fob account provider and indicating that a particular funding source is to be associated with a particular class of transactions. In this way, the user is permitted to change funding sources from a primary funding source to a secondary funding source. In this context, a "primary" funding source may be the funding source which the account provider may primarily use to retrieve funds and satisfy all or a portion of a merchant transaction request. A "secondary" funding source may be any alternate funding source from which value may be retrieved for satisfying all or a portion of a transaction request. It should be noted that primary and secondary are used herein to illustrate that more than one funding source may be chosen by the user for association with the fob, and that any number of sources may be selected.

In addition, the fob user may provide the fob account provider with a funding protocol for use in determining which funding source to use in accordance with the BIN identifier. For example, the fob user may designate that for a particular type of transaction, a selected funding source identified by the BIN identifier is to be automatically used. In this way, the fob user is assured that particular transactions will be satisfied (e.g., completed) using an identified funding source and/or the fob account provider may send all similar transactions to an identified funding source, thereby facilitating tracking of the similar transactions.

The funding protocol may additionally include guidelines for automatically changing to a secondary funding source when the requested transaction amount meets or exceeds the available value of the primary funding source. That is, the funding protocol indicates to the account provider that the funds for satisfying a merchant request should be retrieved from a secondary funding source when the value in the primary funding source is insufficient for completing the transaction. Alternatively, the funding protocol may indicate to the account provider that the transaction should be completed using value from both the primary and secondary funding sources. The amount retrieved from the primary and secondary funding sources may be based on a calculated formula defined by the fob user or fob issuer. In a typical example, where a particular BIN identifier is identified by the account provider, the account provider may seek to retrieve a percentage of the value needed from the primary funding source with the balance of the transaction retrieved from the secondary funding source. Alternatively, the value in the primary funding source may be depleted prior to retrieving the balance of the requested transaction from the secondary funding source.

In a further exemplary embodiment, the invention provides methods for processing a transaction request whereby the amount of the transaction request may be approved prior to requesting funding from the funding source and/or verifying that the amount for completing the transaction is available by referencing the BIN identifier included in a transaction request. In this way, the transaction may be approved provided the transaction and/or account meets certain predetermined authorization criteria. Once the criteria is met, the transaction is authorized and authorization is provided to the requesting agent (e.g., merchant). In one instance the payment for the transaction is requested from the funding source simultaneously to, or immediately following, the providing of the authorization to the merchant. In another instance the payment for transactions is requested at a time period later than when the authorization is provided to the merchant.

These features and other advantages of the system and method, as well as the structure and operation of various exemplary embodiments of the system and method, are described below.

BRIEF DESCRIPTION OF THE DRAWINGS

The accompanying drawings, wherein like numerals depict like elements, illustrate exemplary embodiments of the present invention, and together with the description, serve to explain the principles of the invention. In the drawings:

FIG. 6 depicts an exemplary personalization system useful with the present invention;

DETAILED DESCRIPTION

Figure 1:
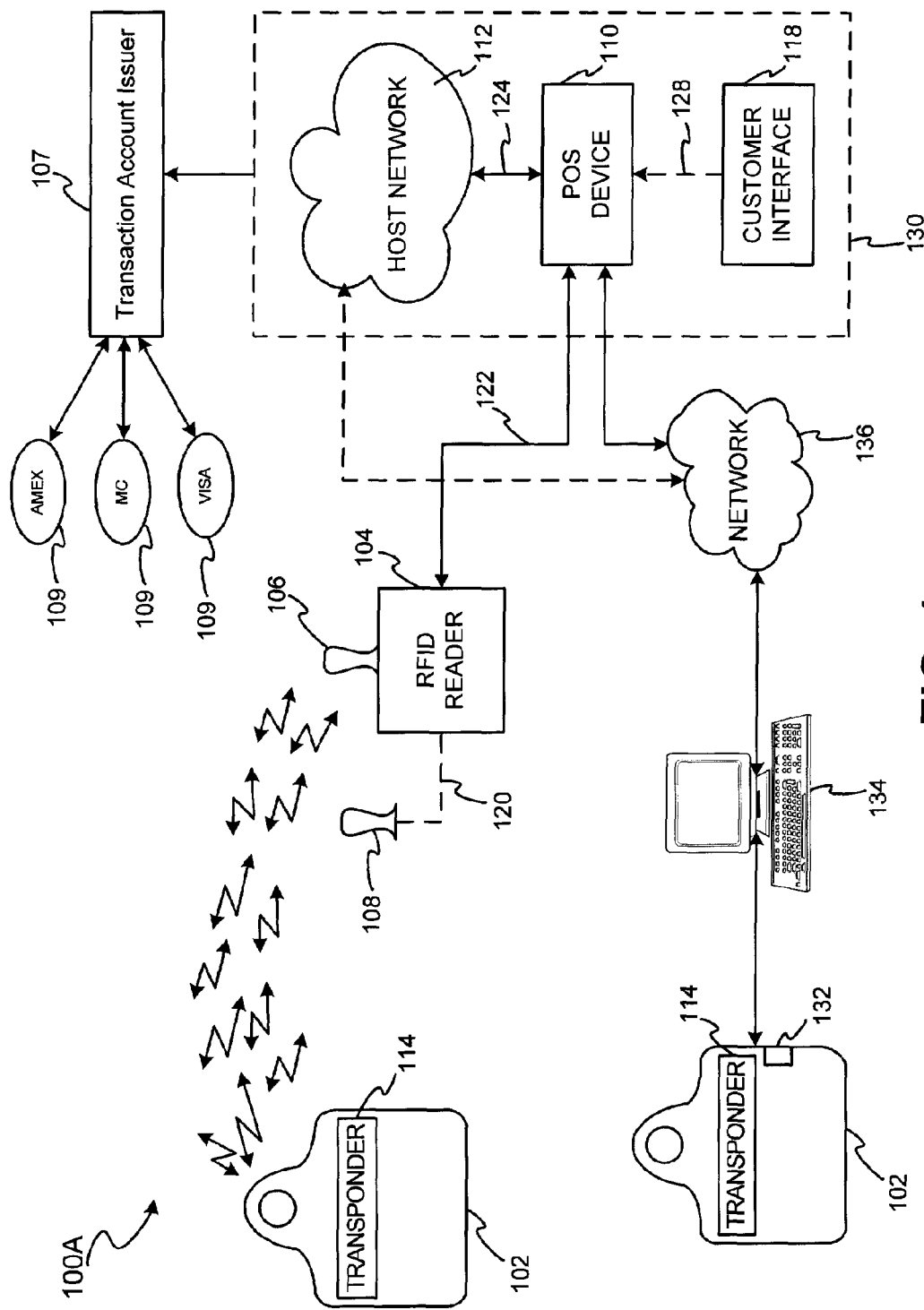
FIG. 1 illustrates an exemplary RFID-based system in accordance with the present invention, wherein exemplary components used for fob transaction completion are depicted.

The present invention may be described herein in terms of functional block components, screen shots, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), Javacard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

In addition, many applications of the present invention could be formulated. The exemplary network disclosed herein may include any system for exchanging data or transacting business, such as the Internet, an intranet, an extranet, WAN, LAN, satellite communications, and/or the like. It is noted that the network may be implemented as other types of networks, such as an interactive television network (ITN).

Where required, the system user may interact with the system via any input device such as, a keypad, keyboard, mouse, kiosk, personal digital assistant, handheld computer (e.g., Palm Pilot®, Blueberry®), cellular phone and/or the like. Similarly, the invention could be used in conjunction with any type of personal computer, network computer, work station, minicomputer, mainframe, or the like, running any operating system such as any version of Windows, Windows NT, Windows 2000, Windows 98, Windows 95, MacOS, OS/2, BeOS, Linux, UNIX, Solaris, or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates, the use, sale, or distribution of any goods, services or information over any network having similar functionality described herein.

The present invention provides a system and method for using a portion of a BIN number to establish a funding protocol for transaction processing. In this context, the BIN number is an identifier included in a transaction account number that is used to identify the transaction account issuer to which a transaction is to be forwarded for processing. In this sense, the BIN number is ordinarily an ordinary type of routing number enabling a merchant system to route a transaction request to the proper transaction account issuer for processing. In accordance with the invention, as described more fully below, the transaction account issuer may use a portion of the BIN number received (e.g., BIN identifier) to determine the transaction processing protocol associated therewith. The BIN identifier may be used to define a funding protocol for the funding source associated with it.

FIG. 1 illustrates an exemplary RFID transaction system 100 in accordance with the present invention, which is described to facilitate understanding of the invention. System 100 includes a fob 102 in RF communication with a RFID reader 104 to transfer user account information. The RFID reader 104 is in communication with a merchant POS 110, which is in communication with a RF module account issuer via a network for transmitting user account data thereto for transaction processing. In general, the operation of system 100 may begin when fob 102 is presented for payment, and is interrogated by RFID reader 104 or, alternatively, interface 134. Fob 102 and RFID reader 104 may then engage in mutual authentication after which the transponder 102 may provide the transponder identification and/or account identifier to the RFID reader 104 which may further provide the information to the merchant system 130 POS device 110.

Although the present invention is described with respect to a fob 102, the invention is not to be so limited. Indeed, system 100 may include any device having a transponder which is configured to communicate with a RFID reader 104 via RF communication. Typical devices may include, for example, a key ring, tag, card, cell phone, wristwatch or any such form configured with a transponder capable of being presented for interrogation.

The RFID reader 104 may be configured to communicate with fob 102 using a RF internal antenna 106. Alternatively, RFID reader 104 may include an external antenna 108 for communications with fob 102, where the external antenna may be made remote to the RFID reader 104 using a suitable cable and/or data link 120. RFID reader 104 may be further in communication with a merchant system 130 via a data link 122.

The system 100 may include a transaction completion system including a point-of-interaction device such as, for example, a merchant point-of-sale (POS) device 110 or a computer interface (e.g., user interface) 134. In one exemplary embodiment the transaction completion system may include a merchant system 130 including the POS device 110 in communication with a RFID reader 104 (via data link 122). As described more fully below, the transaction completion system may include the user interface 134 connected to a network 136 and to the transponder via a USB connector 132.

Although the point-of-interaction device is described herein with respect to a merchant point-of-sale (POS) device, the invention is not to be so limited. Indeed, a merchant POS device is used herein by way of example, and the point-of-interaction device may be any device capable of receiving fob account data. In this regard, the POS may be any point-of-interaction device enabling the user to complete a transaction using a fob 102. POS device 110 may be in further communication with a customer interface 118 (via data link 128) for entering at least a customer identity verification information. In addition, POS device 110 may be in communication with a merchant host network 112 (via data link 124) for processing any transaction request. In this arrangement, information provided by RFID reader 104 is provided to the POS device 110 of merchant system 130 via data link 122. The POS device 110 may receive the information (and alternatively may receive any identity verifying information from customer interface 118 via data link 128) and provide the information to host system 112 for processing.

A variety of conventional communications media and protocols may be used for data links 120, 122, 124, and 128. For example, data links 120, 122, 124, and 128 may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system 130 including the POS device 110 and host network 112 may reside on a local area network which interfaces to a remote network (not shown) for remote authorization of an intended transaction. The merchant system 130 may communicate with the remote network via a leased line, such as a T1, D3 line, or the like. Such communications lines are described in a variety of texts, such as, "Understanding Data Communications," by Gilbert Held, which is incorporated herein by reference.

An account number, as used herein, may include any identifier for an account (e.g., credit, charge debit, checking, savings, reward, loyalty, or the like) which may be maintained by a transaction account provider (e.g., payment authorization center) and which may be used to complete a transaction. A typical account number (e.g., account data) may be correlated to a credit or debit account, loyalty account, or rewards account maintained and serviced by such entities as American Express®, Visa® and/or MasterCard® or the like. For ease in understanding, the present invention may be described with respect to a credit account. However, it should be noted that the invention is not so limited and other accounts permitting an exchange of goods and services for an account data value is contemplated to be within the scope of the present invention.

In addition, the account number (e.g., account data) may be associated with any device, code, or other identifier/indicia suitably configured to allow the consumer to interact or communicate with the system, such as, for example, authorization/access code, personal identification number (PIN), Internet code, digital certificate, biometric data, and/or other identification indicia. The account number may be optionally located on a rewards card, charge card, credit card, debit card, prepaid card, telephone card, smart card, magnetic stripe card, bar code card, and/or the like. The account number may be distributed and stored in any form of plastic, electronic, magnetic, and/or optical device capable of transmitting or downloading data to a second device. A customer account number may be, for example, a sixteen-digit credit card number, although each credit provider has its own numbering system, such as the fifteen-digit numbering system used by American Express®.

Each company's credit card numbers comply with that company's standardized format such that the company using a sixteen-digit format will generally use four spaced sets of numbers, as represented by the number "0000 0000 0000 0000". In a typical example, the first five to seven digits (e.g., BIN number) are reserved for processing purposes and identify the issuing bank to which a transaction request is to be forwarded, card type and, etc. In this example, the last sixteenth digit is used as a sum check for the sixteen-digit number. The intermediary eight-to-ten digits are used to uniquely identify the customer. In one exemplary embodiment, the account number may include a unique fob serial number and user identification number, as well as specific application applets. The account number may be stored on fob 102 as Track 1 and Track 2 data as defined in ISO/IEC 7813, and further may be made unique to fob 102. As noted, the first five to seven digits are typically used to identify the issuing bank (e.g., funding source), card type or the like. As used herein, the first five to seven digits are termed the BIN number. Ordinarily the BIN number for a particular funding source is fixed. Thus, under the present invention, a portion of the BIN number, called the BIN identifier may be used to establish a funding protocol for a particular funding source, as described in detail below.

Figure 2:
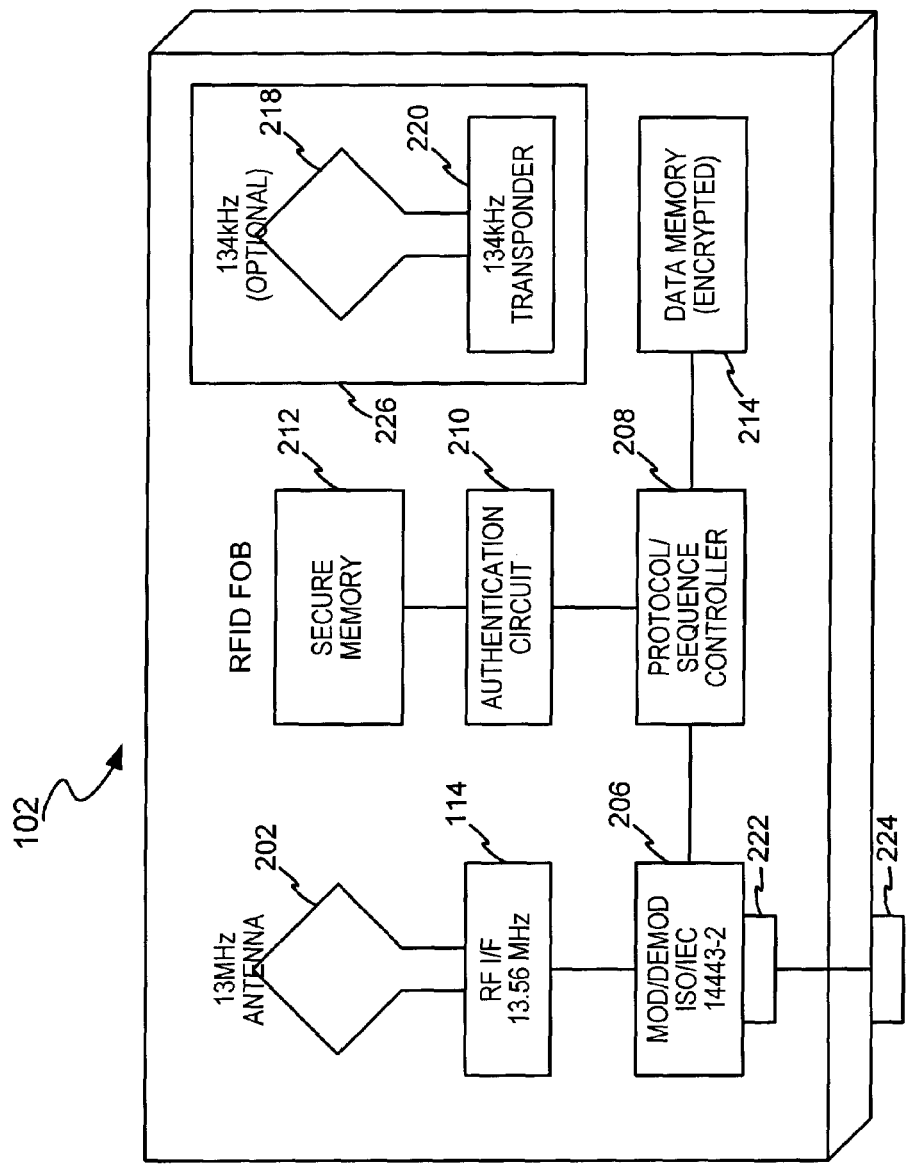
FIG. 2 is a schematic illustration of an exemplary fob in accordance with the present invention.

FIG. 2 illustrates a block diagram of the many functional blocks of an exemplary fob 102 in accordance with the present invention. Fob 102 may be a RF operable fob 102 which may be presented by the user to facilitate an exchange of funds or points, etc., for receipt of goods or services. As described herein, by way of example, the fob 102 may be a RFID fob which may be presented for facilitating payment for goods and/or services.

Fob 102 may include an antenna 202 for receiving an interrogation signal from RFID reader 104 via antenna 106 (or alternatively, via external antenna 108). Fob antenna 202 may be in communication with a fob transponder 114. In one exemplary embodiment, transponder 114 may be a 13.56 MHz transponder compliant with the ISO/IEC 14443 standard, and antenna 202 may be of the 13 MHz variety. The transponder 114 may be in communication with a transponder compatible modulator/demodulator 206 configured to receive the signal from transponder 114 and configured to modulate the signal into a format readable by any later connected circuitry. Further, modulator/demodulator 206 may be configured to format (e.g., demodulate) a signal received from the later connected circuitry in a format compatible with transponder 114 for transmitting to RFID reader 104 via antenna 202. For example, where transponder 114 is of the 13.56 MHz variety, modulator/demodulator 206 may be ISO/IEC 14443-2 compliant.

Modulator/demodulator 206 may be coupled to a protocol/sequence controller 208 for facilitating control of the authentication of the signal provided by RFID reader 104, and for facilitating control of the sending of the fob 102 account number. In this regard, protocol/sequence controller 208 may be any suitable digital or logic driven circuitry capable of facilitating determination of the sequence of operation for the fob 102 inner-circuitry. For example, protocol/sequence controller 208 may be configured to determine whether the signal provided by the RFID reader 104 is authenticated, and thereby providing to the RFID reader 104 the account number stored on fob 102.

Protocol/sequence controller 208 may be further in communication with authentication circuitry 210 for facilitating authentication of the signal provided by RFID reader 104. Authentication circuitry 210 may be further in communication with a non-volatile secure memory database 212. Secure memory database 212 may be any suitable elementary file system such as that defined by ISO/IEC 7816-4 or any other elementary file system allowing a lookup of data to be interpreted by the application on the chip. Database 212 may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database 212 may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The data may be used by protocol/sequence controller 208 for data analysis and used for management and control purposes, as well as security purposes. Authentication circuitry may authenticate the signal provided by RFID reader 104 by association of the RFID signal to authentication keys stored on database 212. Encryption circuitry may use keys stored on database 212 to perform encryption and/or decryption of signals sent to or from the RFID reader 104.

In addition, protocol/sequence controller 208 may be in communication with a database 214 for storing at least a fob 102 account data, and a unique fob 102 identification code. Protocol/sequence controller 208 may be configured to retrieve the account number from database 214 as desired. Database 214 may be of the same configuration as database 212 described above. The fob account data and/or unique fob identification code stored on database 214 may be encrypted prior to storage. Thus, where protocol/sequence controller 208 retrieves the account data, and or unique fob identification code from database 214, the account number may be encrypted when being provided to RFID reader 104. Further, the data stored on database 214 may include, for example, an unencrypted unique fob 102 identification code, a user identification, Track 1 and 2 data, as well as specific application applets.

Figure 3:
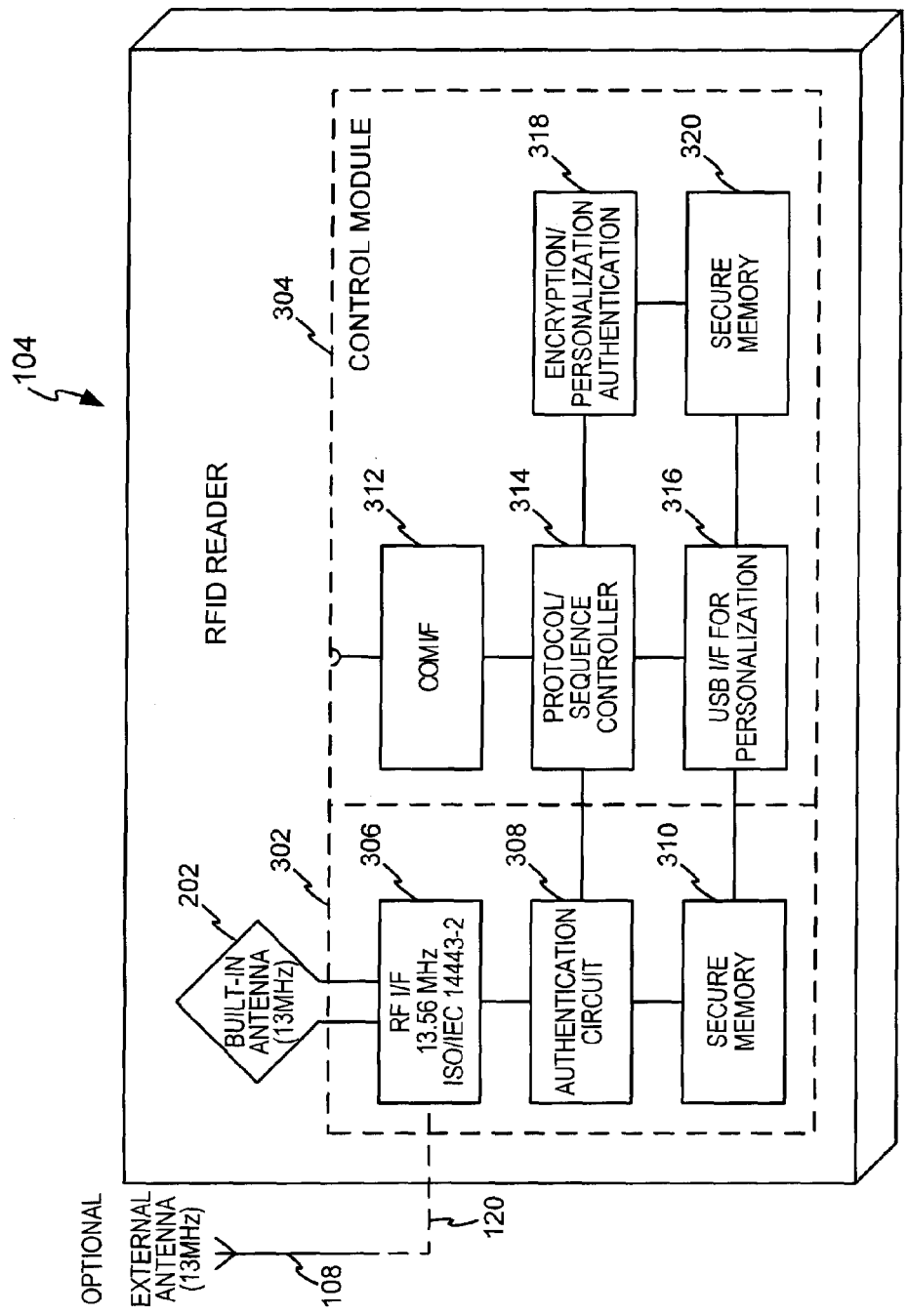
FIG. 3 is a schematic illustration of an exemplary RFID reader in accordance with the present invention.

FIG. 3 illustrates an exemplary block diagram of a RFID reader 104 in accordance with an exemplary embodiment of the present invention. RFID reader 104 includes, for example, an antenna 106 coupled to a RF module 302, which is further coupled to a control module 304. In addition, RFID reader 104 may include an antenna 108 positioned remotely from the RFID reader 104 and coupled to RFID reader 104 via a suitable cable 120, or other wire or wireless connection.

RF module 302 and antenna 106 may be suitably configured to facilitate communication with fob 102. Where fob 102 is formatted to receive a signal at a particular RF frequency, RF module 302 may be configured to provide an interrogation signal at that same frequency. For example, in one exemplary embodiment, fob 102 may be configured to respond to an interrogation signal of about 13.56 MHz. In this case, RFID antenna 106 may be 13 MHz and may be configured to transmit an interrogation signal of about 13.56 MHz. That is, fob 102 may be configured to include a first and second RF module (e.g., transponder) where the first module may operate using a 134 kHz frequency and the second RF module may operate using a 13.56 MHz frequency. The RFID reader 104 may include two receivers which may operate using the 134 kHz frequency, the 13.56 MHz frequency or both. When the reader 104 is operating at 134 kHz frequency, only operation with the 134 kHz module on the fob 102 may be possible. When the reader 104 is operating at the 13.56 MHz frequency, only operation with the 13.56 MHz module on the fob 102 may be possible. Where the reader 104 supports both a 134 kHz frequency and a 13.56 MHz RF module, the fob 102 may receive both signals from the reader 104. In this case, the fob 102 may be configured to prioritize selection of the one or the other frequency and reject the remaining frequency. Alternatively, the reader 104 may receive signals at both frequencies from the fob upon interrogation. In this case, the reader 104 may be configured to prioritize selection of one or the other frequency and reject the remaining frequency.

RFID antenna 106 may be in communication with a transponder 306 for transmitting an interrogation signal and receiving at least one of an authentication request signal and/or an account data from fob 102. Transponder 306 may be of similar description as transponder 114 of FIG. 2. In particular, transponder 306 may be configured to send and/or receive RF signals in a format compatible with antenna 202 in similar manner as was described with respect to fob transponder 114. For example, where transponder 306 is 13.56 MHz RF rated antenna 202 may be 13.56 MHz compatible. Similarly, where transponder 306 is ISO/IEC 14443 rated, antenna 106 may be ISO/IEC 14443 compatible.

RF module 302 may include, for example, transponder 306 in communication with authentication circuitry 308 which may be in communication with a secure database 310. Authentication circuitry 308 and database 310 may be of similar description and operation as described with respect to authentication circuitry 210 and secure memory database 212 of FIG. 2. For example, database 310 may store data corresponding to the fob 102 which are authorized to transact business over system 100. Database 310 may additionally store RFID reader 104 identifying information for providing to fob 102 for use in authenticating whether RFID reader 104 is authorized to be provided the fob account number stored on fob database 214.

Authentication circuitry 308 may be of similar description and operation as authentication circuitry 210. That is, authentication circuitry 308 may be configured to authenticate the signal provided by fob 102 in similar manner that authentication circuitry 210 may be configured to authenticate the signal provided by RFID reader 104. As is described more fully below, fob 102 and RFID reader 104 engage in mutual authentication. In this context, "mutual authentication" may mean that operation of the system 100 may not take place until fob 102 authenticates the signal from RFID reader 104, and RFID reader 104 authenticates the signal from fob 102.

Protocol/sequence controller 314 may be of similar description as protocol/sequence controller 208. That is, protocol/sequence controller 314 may be configured to control the operation of the RFID reader inner circuitry (e.g., authentication circuits, encryption circuits, databases, modulators/demodulators, etc.).

Figure 4:
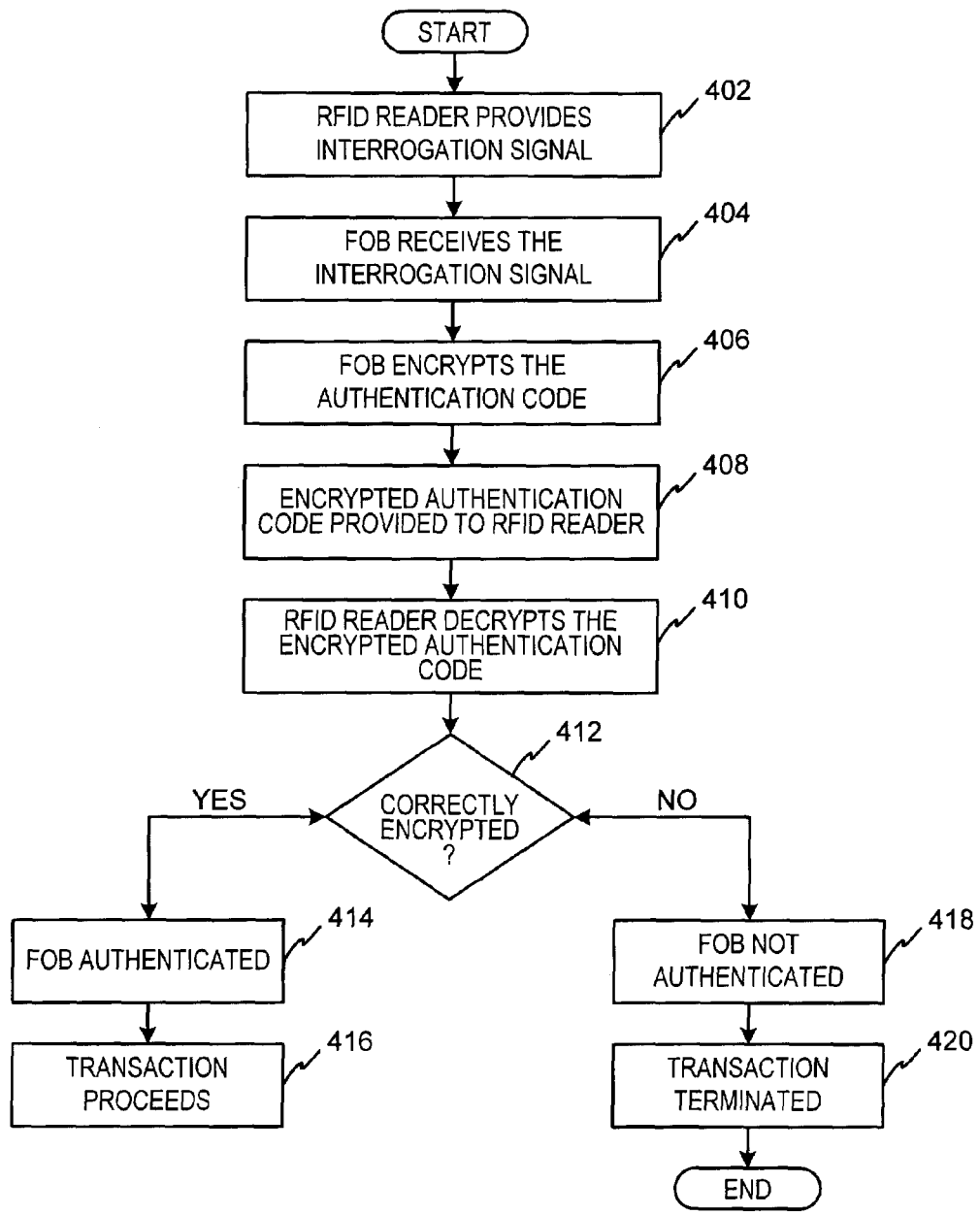
FIG. 4 is an exemplary flow diagram of an exemplary authentication process in accordance with the present invention.

FIG. 4 is a flowchart of an exemplary authentication process in accordance with the present invention. The authentication process is depicted as one-sided. That is, the flowchart depicts the process of the RFID reader 104 authenticating the fob 102, although similar steps may be followed in the instance that fob 102 authenticates RFID reader 104.

As noted, database 212 may store security keys for encrypting or decrypting signals received from RFID reader 104. In an exemplary authentication process, where RFID reader 104 is authenticating fob 102, RFID reader 104 may provide an interrogation signal to fob 102 (step 402). The interrogation signal may include a random code generated by the RFID reader authentication circuit 210, which is provided to the fob 102 and which is encrypted using an unique encryption key corresponding to the fob 102 unique identification code. For example, the protocol/sequence controller 314 may provide a command to activate the authentication circuitry 308. Authentication circuitry 308 may provide from database 310 a fob interrogation signal including a random number as a part of the authentication code generated for each authentication signal. The authentication code may be an alphanumeric code which is recognizable (e.g., readable) by the RFID reader 104 and the fob 102. The authentication code may be provided to the fob 102 via the RFID RF interface 306 and antenna 106 (or alternatively antenna 108).

Fob 102 receives the interrogation signal (step 404). The interrogation signal including the authorization code may be received at the RF interface 114 via antenna 202. Once the fob 102 is activated, the interrogation signal including the authorization code may be provided to the modulator/demodulator circuit 206 where the signal may be demodulated prior to providing the signal to protocol/sequence controller 208. Protocol/sequence controller 208 may recognize the interrogation signal as a request for authentication of the fob 102, and provide the authentication code to authentication circuit 210. The fob 102 may then encrypt the authentication code (step 406). In particular, encryption may be done by authentication circuit 210, which may receive the authentication code and encrypt the code prior to providing the encrypted authentication code to protocol/sequence controller 208. Fob 102 may then provide the encrypted authentication code to the RFID reader 104 (step 408). That is, the encrypted authentication code may be provided to the RFID reader 104 via modulator/demodulator circuit 206, RF interface 114 (e.g., transponder 114) and antenna 202.

RFID reader 104 may then receive the encrypted authentication code and decrypt it (step 410). That is, the encrypted authentication code may be received at antenna 106 and RF interface 306 and may be provided to authentication circuit 308. Authentication circuit 308 may be provided a security authentication key (e.g., transponder system decryption key) from database 310. The authentication circuit may use the authentication key to decrypt (e.g., unlock) the encrypted authorization code. The authentication key may be provided to the authentication circuit based on the fob 102 unique identification code. For example, the encrypted authentication code may be provided along with the unique fob 102 identification code. The authentication circuit may receive the fob 102 unique identification code and retrieve from the database 310 a transponder system decryption key correlative to the unique fob 102 identification code for use in decrypting the encrypted authentication code.

Once the authentication code is decrypted, the decrypted authentication code is compared to the authentication code provided by the RFID reader 104 at step 402 (step 412) to verify its authenticity. If the decrypted authorization code is not readable (e.g., recognizable) by the authentication circuit 308, the fob 102 is deemed to be unauthorized (e.g., unverified) (step 418) and the operation of system 100 is terminated (step 420). Contrarily, if the decrypted authorization code is recognizable (e.g., verified) by the fob 102, the decrypted authorization code is deemed to be authenticated (step 414), and the transaction is allowed to proceed (step 416). In one particular embodiment, the proceeding transaction may mean that the fob 102 may authenticate the RFID reader 104 prior to the RFID reader 104 authenticating fob 102, although, it should be apparent that the RFID reader 104 may authenticate the fob 102 prior to the fob 102 authenticating the RFID reader 104.

It should be noted that in an exemplary verification process, the authorization circuit 308 may determine whether the unlocked authorization code is identical to the authorization code provided in step 402. If the codes are not identical then the fob 102 is not authorized to access system 100. Although, the verification process is described with respect to identicality, identicality is not required. For example, authentication circuit 308 may verify the decrypted code through any protocol, steps, or process for determining whether the decrypted code corresponds to an authorized fob 102.

Figure 5:
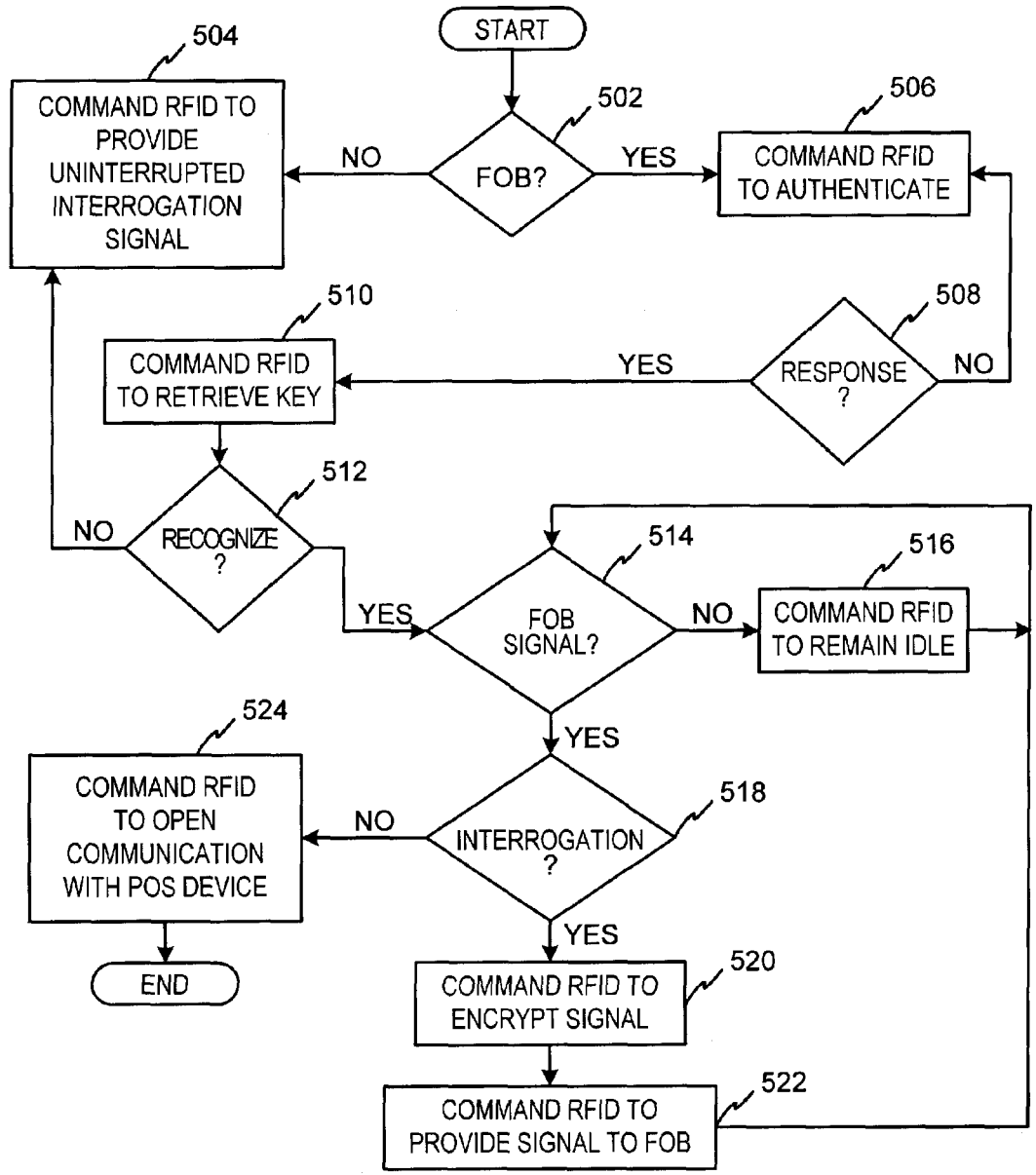
FIG. 5 is an exemplary flow diagram of an exemplary decision process for a protocol/sequence controller in accordance with the present invention.

Authentication circuitry 308 may additionally be in communication with a protocol/sequence controller 314 of similar operation and description as protocol/sequence controller 208 of FIG. 2. That is, protocol/sequence device controller 314 may be configured to determine the order of operation of the RFID reader 104 components. For example, FIG. 5 illustrates and exemplary decision process under which protocol/sequence controller 314 may operate. Protocol/sequence controller 314 may command the different components of RFID reader 104 based on whether a fob 102 is present (step 502). For example, if a fob 102 is not present, then protocol/sequence controller 314 may command the RFID reader 104 to provide an uninterrupted interrogation signal (step 504). That is, the protocol/sequence controller may command the authentication circuit 308 to provide an uninterrupted interrogation signal until the presence of a fob 102 is realized. If a fob 102 is present, the protocol/sequence controller 314 may command the RFID reader 104 to authenticate the fob 102 (step 506).

As noted above, authentication may mean that the protocol/sequence controller 314 may command the authentication circuit 308 to provide fob 102 with an authorization code. If a response is received from fob 102, protocol/sequence controller may determine if the response is a response to the RFID reader 104 provided authentication code, or if the response is a signal requiring authentication (step 508). If the signal requires authentication, then the protocol/sequence controller 314 may activate the authentication circuit as described above (step 506). On the other hand, if the fob 102 signal is a response to the provided authentication code, then the protocol/sequence controller 314 may command the RFID reader 104 to retrieve the appropriate security key for enabling recognition of the signal (step 510). That is, the protocol/sequence controller 314 may command the authentication circuit 308 to retrieve from database 310 a security key (e.g., transponder system decryption key), unlock the signal, and compare the signal to the signal provided by the RFID reader 104 in the authentication process (e.g., step 506). If the signal is recognized, the protocol/sequence controller 314 may determine that the fob 102 is authorized to access the system 100. If the signal is not recognized, then the fob 102 is considered not authorized. In which case, the protocol/sequence controller 314 may command the RFID controller to interrogate for authorized fobs (step 504).

Once the protocol/sequence controller determines that the fob 102 is authorized, the protocol/sequence controller 314 may seek to determine if additional signals are being sent by fob 102 (step 514). If no additional signal is provided by fob 102, then the protocol/sequence controller 314 may provide all the components of RFID reader 104 to remain idle until such time as a signal is provided (step 516). Contrarily, where an additional fob 102 signal is provided, the protocol/sequence controller 314 may determine if the fob 102 is requesting access to the merchant point-of-sale terminal 110 (e.g., POS device) or if the fob 102 is attempting to interrogate the RFID reader 104 for return (e.g., mutual) authorization (step 518). Where the fob 102 is requesting access to a merchant point-of-sale terminal 110, the protocol/sequence controller 314 may command the RFID reader 104 to open communications with the point-of-sale terminal 110 (step 524). In particular, the protocol/sequence controller 314 may command the point-of-sale terminal communications interface 312 to become active, permitting transfer of data between the RFID reader 104 and the merchant point-of-sale terminal 110.

On the other hand, if the protocol/sequence controller determines that the fob 102 signal is a mutual interrogation signal, then the protocol/sequence controller may command the RFID reader 104 to encrypt the signal (step 520). The protocol/sequence controller 314 may command the encryption authentication circuit 318 to retrieve from database 320 the appropriate encryption key in response to the fob 102 mutual interrogation signal. The protocol/sequence controller 314 may then command the RFID reader 104 to provide the encrypted mutual interrogation signal to the fob 102. The protocol/sequence controller 314 may command the authentication circuit 318 to provide an encrypted mutual interrogation signal for the fob 102 to mutually authenticate. Fob 102 may then receive the encrypted mutual interrogation signal and retrieve from authentication circuitry 212 a RFID reader decryption key.

Although an exemplary decision process of protocol/sequence controller 314 is described, it should be understood that a similar decision process may be undertaken by protocol/sequence controller 208 in controlling the components of fob 102. Indeed, as described above, protocol/sequence controller 314 may have similar operation and design as protocol/sequence controller 208. In addition, to the above, protocol/sequence controllers 208 and 314 may incorporate in the decision process appropriate commands for enabling USB interfaces 222 and 316, when the corresponding device is so connected.

Encryption/decryption component 318 may be further in communication with a secure account number database 320 which stores the security keys necessary for decrypting the encrypted fob account number. Upon appropriate request from protocol/sequence controller 314, encryption/decryption component (e.g., circuitry 318) may retrieve the appropriate security key, decrypt the fob account number and forward the decrypted account number to protocol sequence controller 314 in any format readable by any later connected POS device 110. In one exemplary embodiment, the account number may be forwarded in a conventional magnetic stripe format compatible with the ISO/IEC 7813 standard. Upon receiving the account number in magnetic stripe format, protocol/sequence controller 314 may forward the account number to POS device 110 via a communications interface 312 and data link 122, as best shown in FIG. 1. POS device 110 may receive the decrypted account number and forward the magnetic stripe formatted account number to a merchant network 112 for processing. In this way, the present invention eliminates the need of a third-party server. Further, where the POS device 110 receives a response from network 112 (e.g., transaction authorized or denied), protocol/sequence controller 314 may provide the network response to the RF module 302 for optically and/or audibly communicating the response to the fob 102 user.

RFID reader 104 may additionally include a USB interface 316, in communication with the protocol/sequence controller 314. In one embodiment, the USB interface may be a RS22 serial data interface. Alternatively, the RFID reader 104 may include a serial interface such as, for example, a RS232 interface in communication with the protocol/sequence controller 314. The USB connector 316 may be in communication with a personalization system 116 (shown in FIG. 1) for initializing RFID reader 104 to system 100 application parameters. That is, prior to operation of system 100, RFID reader 104 may be in communication with personalization system 116 for populating database 310 with a listing of security keys belonging to authorized fobs 102, and for populating database 320 with the security keys to decrypt the fob 102 account numbers placing the account numbers in ISO/IEC 7813 format. In this way, RFID reader 104 may be populated with a unique identifier (e.g., serial number) which may be used by fob authentication circuitry 210 to determine if RFID reader 104 is authorized to receive a fob 102 encrypted account number. For a detailed discussion of an exemplary personalization process useful with the invention please see U.S. patent application Ser. No. 10/192,480, entitled "SYSTEM AND METHOD FOR PAYMENT USING RADIO FREQUENCY IDENTIFICATION IN CONTACT AND CONTACTLESS TRANSACTIONS," filed Jul. 9, 2002.

FIG. 6 illustrates an exemplary personalization system 101, in accordance with the present invention. In general, typical personalization system 101 may be any system for initializing the RFID reader 104 and fob 102 for use in system 100. With reference to FIG. 6, the similar personalization process for fob 102 may be illustrated. For example, personalization system 116 may be in communication with fob 102 via RF ISO 14443 interface 114 for populating fob database 212 with the security keys for facilitating authentication of the unique RFID reader 104 identifier. In addition, personalization system 116 may populate on database 212 a unique fob 102 identifier for use by RFID reader 104 in determining whether fob 102 is authorized to access system 100. Personalization system 116 may populate (e.g., inject) the encrypted fob 102 account number into fob database 214 for later providing to an authenticated RFID reader 104.

In one exemplary embodiment, personalization system 116 may include any standard computing system as described above. For example, personalization system 116 may include a standard personal computer containing a hardware security module operable using any conventional graphic user interface. Prior to populating the security key information account number and unique identifying information into the fob 102 or RFID reader 104, the hardware security module may authenticate the fob 102 and RFID reader 104 to verify that the components are authorized to receive the secure information.

Figure 7A:
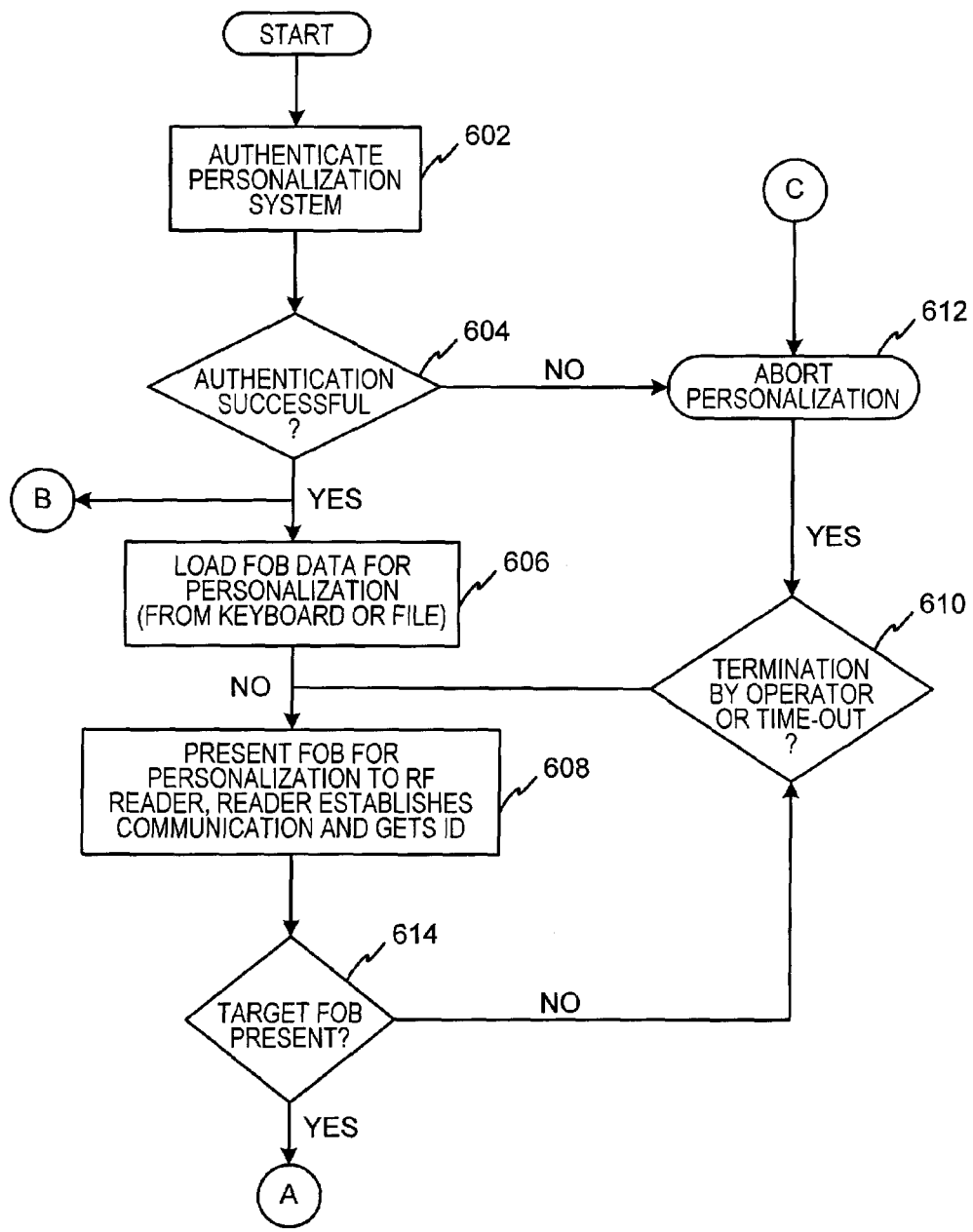
FIGS. 7A-B are an exemplary flow diagram of a fob personalization process in accordance with the present invention.
Figure 7B:
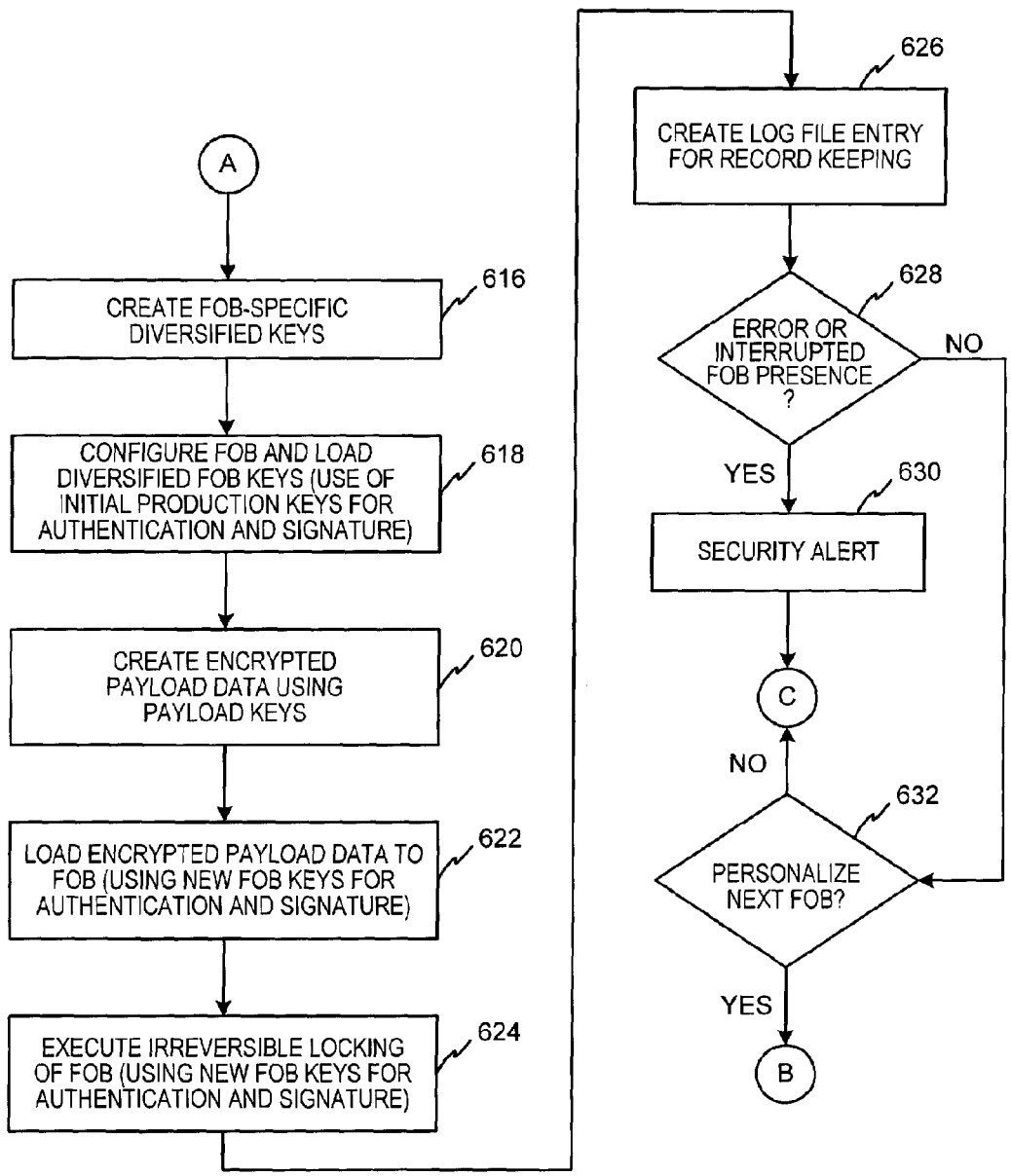

FIGS. 7A-B illustrate an exemplary flowchart of a personalization procedure which may be used to personalize fob 102 and/or RFID reader 104. Although the following description discusses mainly personalization of fob 102, RFID reader 104 may be personalized using a similar process. The personalization process, which occurs between the personalization system 116 and the device to be personalized (e.g., fob 102 or RFID reader 104), may begin, for example at step 602. Mutual authentication may occur between the personalization system 116 and the device to be authenticated in much the same manner as was described above with regard to fob 102 mutually authenticating with RFID reader 104. That is, personalization system 116 may transmit a personalization system 116 identifier to the device to be authenticated which is compared by the device authentication circuitry 210, 308 against personalization system identifiers stored in the device database 212, 310. Where a match does not occur (step 604), the personalization process may be aborted (step 612). Where a match occurs (step 604), the personalization system may prepare a personalization file to be provided to the device to be personalized (step 606). If the personalization system is operated manually, the personalization file may be entered into the personalization system 116 using any suitable system interface such as, for example, a keyboard (step 606). Where the personalization system 116 operator elects to delay the preparation of the personalization files, the system 116 may abort the personalization process (step 610). In this context, the personalization file may include the unique fob 102 or RFID reader 104 identifier, security key for loading into database 212 and 310, and/or security keys for decrypting a fob account number which may be loaded in database 320.

Fob 102 may be personalized by direct connection to the personalization system 116 via RF ISO/IEC 14443 interface 114, or the fob 102 may be personalized using RFID reader 104. Personalization system 116 and RFID reader 104 may engage in mutual authentication and RFID reader 104 may be configured to transmit the fob personalization file to fob 102 via RF. Once the fob 102 is presented to RFID reader 104 (steps 608, 614) for personalization, fob 102 and RFID reader 104 may engage in mutual authentication (step 614). Where the fob 102 is not presented to the RFID reader 104 for personalization, the personalization process may be aborted (step 610).

If the fob 102 is detected, the personalization system 116 may create as a part of the personalization file, a unique identifier for providing to the fob 102 (step 616). The identifier is unique in that one identifier may be given only to a single fob. That is, no other fob may have that same identifier. The fob may then be configured and loaded with that identifier (step 618).

The encrypted fob 102 account number may be populated into fob 102 in the same manner as is described with respect to the fob 102 unique identifier. That is, personalization system 116 may pre-encrypt the account data (step 620) and inject the encrypted account into fob database 214 (step 622). The encrypted account data may be loaded (e.g., injected) into the fob 102 using RFID reader 104 as discussed above.

Once the personalization file is populated into the fob 102, the populated information is irreversibly locked to prevent alteration, unauthorized reading and/or unauthorized access (step 624). Personalization system 116 may then create a log of the personalization file information for later access and analysis by the personalization system 116 user (step 626).

It should be noted that in the event the personalization process is compromised or interrupted (step 628), the personalization system 116 may send a security alert to the user (step 630) and the personalization process may be aborted (step 612). On the other hand, where no such compromising or interruption exists, the personalization system 116 may be prepared to begin initialization on a second device to be personalized (step 632).

Figure 8:
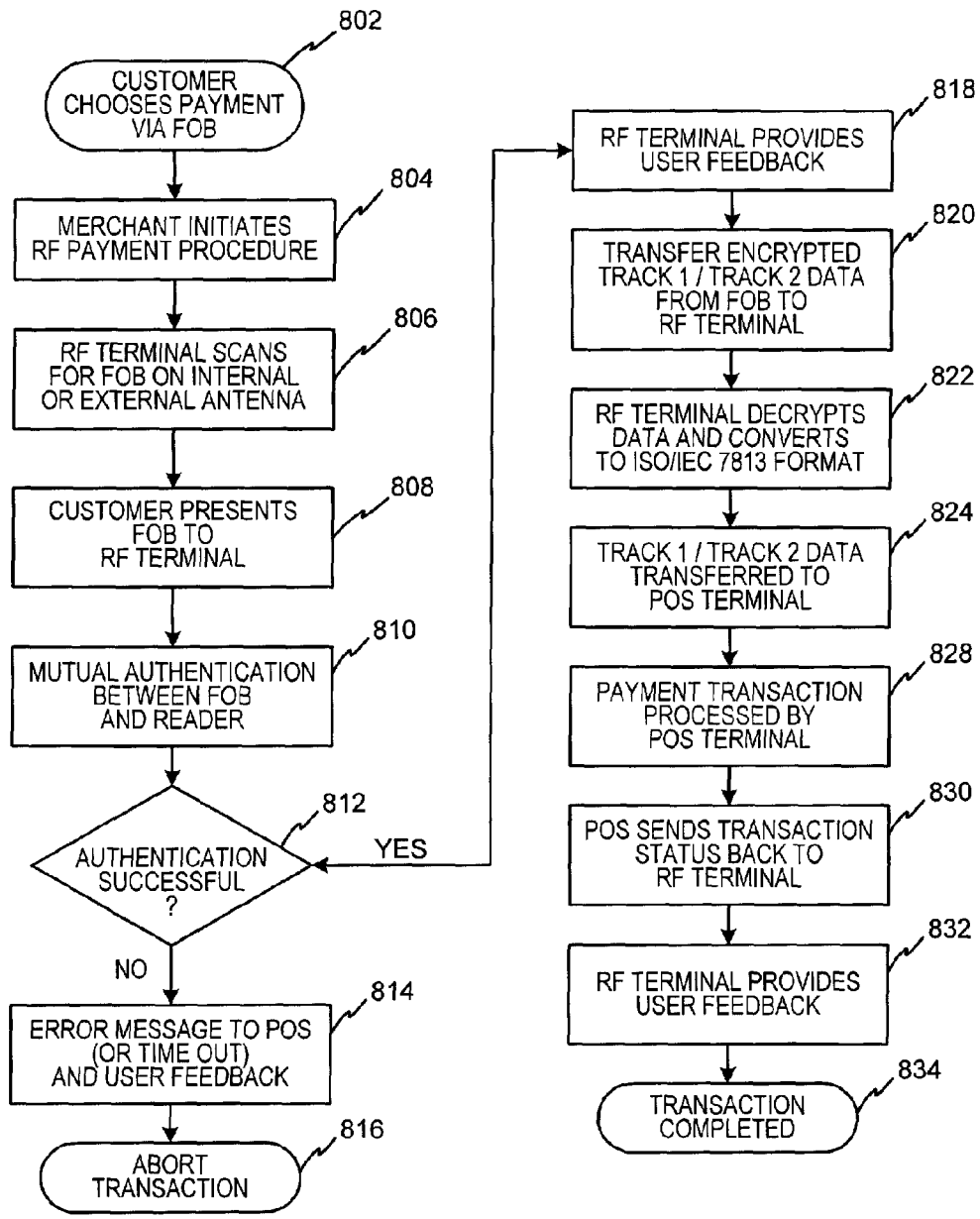
FIG. 8 is a flow diagram of an exemplary payment/transaction process in accordance with the present invention.

FIG. 8 illustrates an exemplary flow diagram for the general operation of system 100. The operation may be understood with reference to FIG. 1, which depicts the elements of system 100 which may be used in an exemplary transaction. The process is initiated when a customer desires to present a fob 102 for payment (step 802). Upon presentation of the fob 102, the merchant initiates the RF payment procedure via an RFID reader 104 (step 804). In particular, the RFID reader sends out an interrogation signal to scan for the presence of fob 102 (step 806). The RF signal may be provided via the RFID reader antenna 106 or optionally via an external antenna 108. The customer then may present the fob 102 for payment (step 808) and the fob 102 is activated by the RF interrogation signal provided.

The fob 102 and the RFID reader 104 may then engage in mutual authentication (step 810). Where the mutual authentication is unsuccessful, an error message may be provided to the customer via the RFID optical and/or audible indicator (step 814) and the transaction may be aborted (step 816). Where the mutual authentication is successful (step 812), the RFID reader 104 may provide the customer with an appropriate optical and/or audible message (e.g., "transaction processing" or "wait") (step 818). The fob protocol/sequence controller 208 may then retrieve from database 214 an encrypted fob account number and provide the encrypted account number to the RFID reader 104 (step 820).

The RFID reader 104 may then decrypt the account number and convert the account number into magnetic stripe (ISO/IEC 7813) format (step 822) and provide the unencrypted account number to the merchant system 130 (step 828). In particular, the account number may be provided to the POS 110 included in the merchant system 130. The merchant system 130 may form a transaction request, including the account number, and forward the transaction request to transaction account issuer 107 for transaction processing. Upon processing, the POS device 110 may then send an optical and/or audible transaction status message to the RFID reader 104 (step 830) for communication to the customer (step 832).

The methods for processing the transactions may include one of several transaction processing protocols as required by the fob issuer or account holder.

In one exemplary transaction method according to the invention, the transaction account may be associated with a funding source 109, for use in satisfying the transaction request. The transaction account issuer 107 may receive the account number and retrieve from the account number the BIN number identifying the funding source 109 for transaction processing. As noted, contained within the BIN number is the BIN identifier. The transaction account issuer 107 retrieves the BIN identifier and processes the transaction request in accordance with the user or issuer defined protocol associated with the BIN identifier.

The transaction account provider 107 may use any method for obtaining the BIN identifier and the method may be issuer defined. For example, the transaction account issuer 107 may designate a fixed portion of the BIN number as the BIN identifier so that the BIN identifier may be retrieved by referencing the fixed portion. For example, if the BIN number consists of the first seven digits of an account number, the transaction account issuer 107 may designate the sixth digit as the BIN identifier. The transaction account issuer 107 may then process the transaction in accordance with the transaction processing protocol associated with that sixth digit. The protocol may be contained on the transaction account issuer 107 system. The protocol may be stored, for example, in a computer-readable memory as a set of commands to be followed in processing the merchant's transaction request. Once the protocol is performed, the transaction account issuer notifies the funding source 107 of the transaction results (e.g., transaction approved, transaction denied, transaction account adjustment, etc.) and informs the merchant system 130 of the actions to be taken.

The transaction protocol associated with the BIN number may include usage restrictions, such as, for example, a per purchase spending limit, a time of day use, a day of week use, certain merchant use and/or the like, wherein an additional verification is required when using the fob outside of the restriction. The restrictions may be personally assigned by the fob 102 user, or the account provider. For example, in one exemplary embodiment, the account may be established such that purchases above $X (i.e., the spending limit) must be verified by the customer. Such verification may be provided using a suitable personal identification number (PIN) which may be recognized by the RFID reader 104 or a payment authorization center (not shown) as being unique to the fob 102 holder (e.g., customer) and the correlative fob 102 transaction account number. Where the requested purchase is above the established per purchase spending limit, the customer may be required to provide, for example, a PIN, biometric sample and/or similar secondary verification to complete the transaction.

Where a verification PIN is used as secondary verification the verification PIN may be checked for accuracy against a corroborating PIN which correlates to the fob 102 transaction account number. The corroborating PIN may be stored locally (e.g., on the fob 102, or on the RFID reader 104) or may be stored on a database (not shown) at the payment authorization center. The payment authorization center database may be any database maintained and operated by the fob 102 transaction account provider.

The verification PIN may be provided to the POS device 110 using a conventional merchant (e.g., POS) PIN key pad 118 in communication with the POS device 110 as shown in FIG. 1, or a RFID keypad in communication with the RFID reader 104. PIN keypad may be in communication with the POS device 110 (or alternatively, RFID reader 104) using any conventional data link described above. Upon receiving the verification PIN, the RFID reader 104 may seek to match the PIN to the corroborating PIN stored on the RFID reader 104 at database 310 or 320. Alternatively, the verification PIN may be provided to a payment authorization center to determine whether the PIN matches the PIN stored on the payment authorization center database which correlates to the fob 102 account. If a match is made, the purchase may no longer be restricted, and the transaction may be allowed to be completed.

In accordance with another exemplary embodiment of the invention, the fob user is provided limited access to a fob user data file maintained on an issuer system 107 for managing the transaction processing protocol. The fob user may access the fob user data file to change, for example, the funding source (e.g., credit account, charge account, rewards account, barter account, etc.) associated with a BIN identifier, view the transaction history, etc.

With reference to FIG. 1, the fob user may connect the fob 102 to a computer interface 134 via the USB interface 132. The fob user may then use the computer interface 134 to access the fob user data file via the network 136. In particular, the network 136 may be in communication with an transaction account issuer system (e.g. system 107 of FIG. 1) and may be provided limited access to an issuer system 107 for managing the fob. The issuer system 107 may be in communication with an issuer system database (not shown) which stores the information to be managed relative to the user fob user data file. The changes made to the fob user data file by the fob user may be made in real-time, after a brief delay, or after an extended delay. In one instance, changes may be stored in a batch changes file on the issuer database for later batch processing.

The fob user may be provided limited access to all or a portion of the issuer system 107 to define the transaction processing protocol (e.g., funding protocol) for use in satisfying a transaction request. The fob user may be permitted access to all or a portion of the issuer database for defining the protocol for determining the funding source to be used for a particular transaction. The fob user may be permitted to select one or more particular funding source for use with the fob depending on the conditions of the transaction request. For example, the funding protocol may indicate to the issuer 107 (e.g., account provider) that a particular funding source is to be used for an identified class of transactions or for a particular merchant. Alternatively, the funding protocol may indicate that a combination of sources may be used to satisfy a transaction request. In this arrangement, the primary, secondary, tertiary funding sources may have similar descriptions as any one of funding sources 109 described above.

Figure 9:
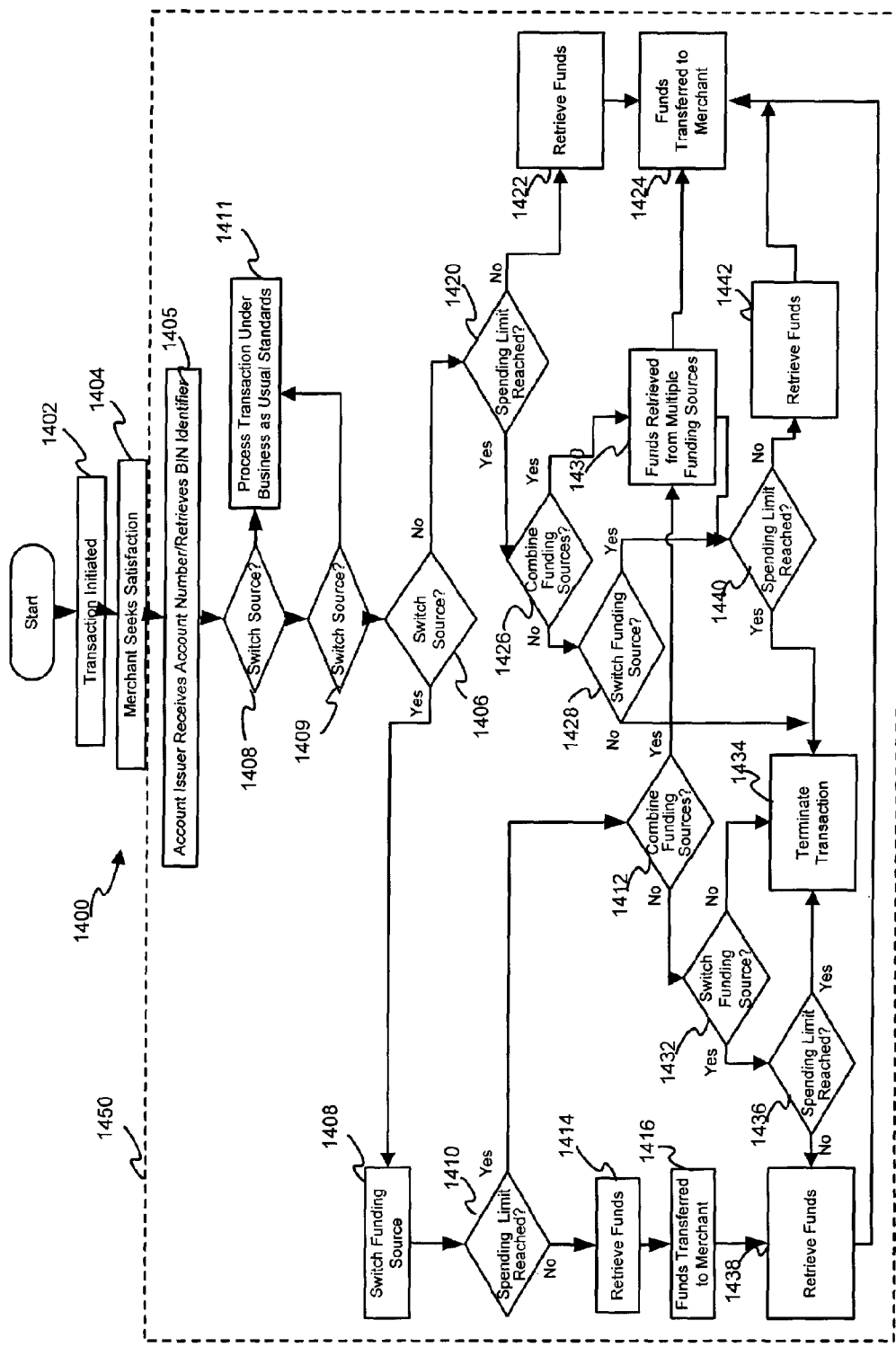
FIG. 9 is an exemplary flow diagram of a funding protocol for use by the fob account provider in satisfying a transaction request.

FIG. 9 depicts an exemplary funding protocol 1400 which the user or transaction account issuer 107 may define for a particular BIN number. As shown, the funding protocol may be initiated when the fob 102 is presented for payment (step 1402). The fob 102 may be presented to a RFID reader 104. The RFID reader 104 or the computer interface 134 may provide an account number to the merchant system 130 and the merchant system 130 may seek satisfaction of a transaction request from an issuer system 107 (step 1404). As noted, the transaction request includes the BIN number and BIN identifier used to determine the corresponding protocol to be used for transaction processing.

The account issuer 107 may receive the transaction request and obtain the BIN identifier as discussed above (step 1405) for transaction satisfaction using a particular funding source. The transaction account issuer 107 may use the BIN identifier to retrieve the corresponding funding protocol illustrated by funding protocol 1450 on FIG. 9 from the transaction account issuer system. The funding protocol 1450 illustrates a protocol designed to effectuate transaction processing for a particular funding source 109 identified by the BIN identifier as it relates to a merchant system 130 or a class of transactions.

The transaction account issuer 107 may receive the transaction request and determine if the transaction request falls into a class of transactions predetermined to be processed according to the protocol identified by the BIN identifier (step 1407). The transaction account provider may also determine whether the merchant system 130 providing the transaction request is identified for processing under the transaction protocol (step 1409). If the class of transactions or the merchant system 130 are not within the protocol parameters, the transaction processing system processes the transaction request under the business as usual standards defined by the transaction processing system 107 (step 1411).

For example, if a merchant (or transaction) is identified, the protocol transaction account issuer 107 may determine whether the protocol requires the transaction account issuer 107 to switch the funding source associated with the fob 102 from a primary funding source to a secondary funding source (step 1408). The transaction account issuer 107 may additionally determine whether the spending limit for the secondary funding source has been reached or exceeded (step 1410). If the spending limit for the secondary funding sources is not exceeded, then the server may retrieve the appropriate value for satisfying a transaction request from the secondary funding source (step 1414). The funds may then be transferred to the merchant system 130 under any business as usual standard (step 1416), completing the merchant's transaction request.

In some instances, the funding may be switched from the primary funding source to the secondary funding source (step 1408), and the spending limit for the secondary sources is reached or exceeded (step 1410). In which case, the transaction account issuer 107 may use the protocol to determine whether the fob user has indicated that the merchant transaction request is to be satisfied using funds retrieved from a combination of funds received from the primary and secondary funding sources (step 1412). The combination of funds may be retrieved using any formula determined by the fob user or fob account issuer (step 1430), and the funds may be transferred to the merchant system 130, satisfying the merchant transaction request.

In another embodiment, the transaction account issuer 107 may determine if a switch is to be made to yet a tertiary funding source (step 1432). In which case, the transaction account issuer 107 may determine if the spending limit for the tertiary funding source has been reached or exceeded (step 1436). If the funds are exceeded, the merchant request may be terminated and a "transaction denied" message may be forwarded to the merchant system 130 (step 1434).

Where the funding source is not to be switched (step 1406), the transaction account issuer 107 may not switch from a primary funding source to a secondary funding source. Instead, the transaction account issuer 107 may determine whether the spending limit on the primary source is reached or exceeded (step 1420). If the spending limit on the primary source is not exceeded, then the appropriate funds for satisfying the merchant request may be retrieved from the primary funding source (step 1422) and transferred to the merchant system 130 under business as usual standards (step 1424).

Contrarily, where the spending limit on the primary funding source is reached or exceeded (step 1420), in one embodiment, the transaction account issuer 107 may determine whether to combine funds retrieved from a primary funding source and a secondary funding source to satisfy the merchant transaction request (step 1426). If the primary and secondary funding sources are to be combined, funds may be retrieved from the multiple funding sources using any formula as determined by the fob user or fob account issuer (step 1430). The funds may then be transferred to the merchant system 130 under business as usual standards (step 1424).

If the funds from the primary and secondary funding sources are not to be combined, the transaction account issuer 107 may determine whether to switch from a primary funding source to a secondary funding source (step 1428). If no switch is to be made and the transaction request exceeds the primary funding source limit, then the transaction request may be terminated and a "transaction denied" may be provided to the merchant under business as usual standards (step 1434).

On the other hand, should the funding source be switched from a primary funding source to a secondary funding source, the transaction account issuer 107 may determine whether the spending limit for the secondary funding source is reached or exceeded (step 1440). If the spending limit for the secondary funding source is reached or exceeded, then the transaction may be terminated and a "transaction denied" message maybe provided to the merchant system 130 under business as usual standards (step 1434). If the spending limit for the secondary funding source is not reached or exceeded, the appropriate funds for satisfying the transaction request may be retrieved from the secondary funding source (step 1442) and transferred to the merchant system 130 (step 1424), satisfying the transaction request.

Although the present invention depicts a protocol 1450 useful with the invention, the invention contemplates other transaction processing protocols.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

What is claimed is:

1. A method for facilitating the management of a transaction request using a BIN identifier, comprising:

receiving, by a computer-based system for facilitating the management of a transaction request, at least one funding protocol parameter from a customer;

receiving, by the computer-based system, a transaction request, the transaction request including a transaction account number associated with a transaction account, wherein the transaction account is associated with the customer;

retrieving, by the computer-based system, a bank identification number (BIN) from the transaction account number, wherein the BIN indicates at least a transaction account issuer of the transaction account number;

routing, by the computer-based system, the transaction request to the transaction account issuer identified by the BIN;

retrieving, by the computer-based system, a BIN identifier from a portion of the BIN, the BIN identifier identifying a funding protocol for the transaction account;

retrieving, by the computer-based system, predefined parameters of the funding protocol, the predefined parameters defining a class of transactions to be processed according to the funding protocol, wherein a first transaction class is associated with a first funding source and a second transaction class is associated with a second funding source;

determining, by the computer-based system, that the transaction request satisfies the predefined parameters of the funding protocol; and in response to the transaction request satisfying the predefined parameters of the funding protocol, processing, by the computer-based system, the transaction request in accordance with the funding protocol identified by the BIN identifier, and otherwise processing the transaction request with a non-customer-defined protocol.

2. The method of claim 1, comprising associating the BIN identifier to the first funding source or the second funding source.

3. The method of claim 2, comprising associating the BIN identifier to the funding protocol, wherein the BIN identifier is unique to the first funding source or the second funding source.

4. The method of claim 2, comprising associating the transaction account number to a transaction device.

5. The method of claim 4, comprising associating the transaction account number to a transaction device, wherein the transaction account number is unique to the transaction device.

6. The method of claim 2, comprising defining the BIN identifier as a fixed portion of the BIN, the BIN being fixed for a particular funding source.

7. The method of claim 2, comprising updating the funding protocol prior to processing the transaction request.

8. The method of claim 1, comprising defining the funding protocol in accordance with the first funding source or the second funding source.

9. The method of claim 8, comprising forwarding a portion of the transaction request to the first funding source or the second funding source for processing in accordance with the funding protocol.

10. The method of claim 9, comprising forwarding a portion of the transaction request to the first funding source or the second funding source in accordance with the BIN.

11. The method of claim 10, comprising receiving the transaction request from a merchant system, wherein the merchant system receives the transaction account number via radio frequency.

12. The method of claim 11, wherein the merchant system receives the transaction account number in magnetic stripe format.

13. A system configured to facilitate managing a transaction request using a bank identification number (BIN) comprising:
a transaction account issuer system configured to:
receive at least one funding protocol parameter from a customer;
receive a transaction request including, a transaction account number associated with a transaction account, the transaction account number including the BIN, wherein the transaction account is associated with the customer;
a transaction account issuer server for extracting a BIN identifier from a portion of the BIN, the BIN identifier identifying a funding protocol for the transaction account; and
a transaction account issuer database for storing:
the BIN identifier relative to the funding protocol for the transaction account,
the BIN relative to a funding source, and
predefined parameters of the funding protocol, the predefined parameters defining a class of transactions to be processed according to the funding protocol, wherein a first transaction class is associated with a first funding source and a second transaction class is associated with a second funding source;
wherein the transaction account issuer system is configured to:
receive the transaction request,
retrieve the BIN identifier from the transaction account number,
determine whether the transaction request satisfies the predefined parameters of the funding protocol,
if the transaction request satisfies the predefined parameters of the funding protocol, process the transaction request in accordance with the funding protocol identified by the BIN identifier, and otherwise process the transaction request with a non-customer-defined protocol, and
forward the transaction request to the funding source for processing, the transaction request being forwarded in accordance with the BIN.

14. A tangible non-transitory computer readable storage medium having computer-executable instructions stored thereon that, if executed by a computer based system configured to facilitate managing a transaction request, cause said computer based system to perform a method comprising:
receiving at least one funding protocol parameter from a customer;
receiving a transaction request, the transaction request including a transaction account number associated with a transaction account, wherein the transaction account is associated with the customer;
retrieving a bank identification number (BIN) from the transaction account number, wherein the BIN indicates at least a transaction account issuer of the transaction account number;
routing the transaction request to the transaction account issuer identified by the BIN;
retrieving a BIN identifier from a portion of the BIN, the BIN identifier identifying a funding protocol for the transaction account;
retrieving predefined parameters of the funding protocol, the predefined parameters defining a class of transactions to be processed according to the funding protocol, wherein a first transaction class is associated with a first funding source and a second transaction class is associated with a second funding source;
determining whether the transaction request satisfies the predefined parameters of the funding protocol; and
if the transaction request satisfies the predefined parameters of the funding protocol, processing the transaction request in accordance with the funding protocol identified by the BIN identifier, and otherwise processing the transaction request with a non-customer-defined protocol.

15. The computer-readable storage medium of claim 14 configured for associating the BIN identifier to the first funding source or the second funding source.

16. The computer-readable storage medium of claim 15 configured for associating the BIN identifier to the funding protocol, wherein the BIN identifier is unique to the first funding source or the second funding source.

17. The method of claim 1, wherein the predefined parameters further define a merchant identified for processing under the funding protocol.

18. The method of claim 1, further comprising requiring the customer to provide at least one of a PIN or a biometric sample to complete the transaction request in response to a transaction amount of the transaction request being greater than a predetermined per purchase spending limit.

19. The method of claim 1, wherein the transaction account issuer determines if the transaction request is part of the class of transactions predetermined to be processed according to the funding protocol.

20. The method of claim 17, wherein the transaction account issuer determines if the funding protocol requires the transaction account issuer to switch funding the transaction request from the first funding source to the second funding source.

21. The method of claim 20, wherein the transaction account issuer combines funds from the first funding source and the second finding source to satisfy the transaction request in response to a spending limit on the first funding source being exceeded.

22. The method of claim 20, wherein the transaction account issuer switches funding of the transaction request from the first funding source to the second funding source in response to a spending limit on the first funding source being exceeded.

* * * * *